US012665819B2

(12) United States Patent
Li et al.

(10) Patent No.: US 12,665,819 B2
(45) Date of Patent: Jun. 23, 2026

(54) MACHINE LEARNING SYSTEMS AND METHODS FOR COMPUTER MODELING AND OPTIMIZATION OF TELECOMMUNICATIONS NETWORKS

(71) Applicant: Cognitive Network Solutions Inc., Ridgefield Park, NJ (US)

(72) Inventors: Terence Li, Fort Lee, NJ (US); Michael Chiaramonte, Jersey City, NJ (US)

(73) Assignee: Cognitive Network Solutions Inc., Ridgefield Park, NJ (US)

( * ) Notice: Subject to any disclaimer, the term of this patent is extended or adjusted under 35 U.S.C. 154(b) by 0 days.

(21) Appl. No.: 19/323,148

(22) Filed: Sep. 9, 2025

(65) Prior Publication Data

US 2026/0135773 A1     May 14, 2026

Related U.S. Application Data

(60) Provisional application No. 63/720,370, filed on Nov. 14, 2024.

(51) Int. Cl.
*H04L 41/16* (2022.01)
*G06N 3/0464* (2023.01)
(52) U.S. Cl.
CPC ........... *H04L 41/16* (2013.01); *G06N 3/0464* (2023.01)

(58) Field of Classification Search
CPC .............................. H04L 41/16; G06N 3/0464
See application file for complete search history.

(56) References Cited

U.S. PATENT DOCUMENTS

| | | | |
|---|---|---|---|
| 2021/0073291 A1* | 3/2021 | Hunter | G06N 3/045 |
| 2023/0118325 A1* | 4/2023 | Mital | G06N 3/063 |
| | | | 718/104 |
| 2023/0351121 A1* | 11/2023 | Hasan | G06F 16/355 |

* cited by examiner

*Primary Examiner* — Minh Chau Nguyen
(74) *Attorney, Agent, or Firm* — McCarter & English, LLP

(57) ABSTRACT

Machine learning systems and methods for computer modeling and optimization of telecommunications networks are provided. The system processes information relating to a telecommunications network, such as a cellular telephone network, and generates a directed network graph that represents the network as a series of connected edges and nodes with associated attributes such as transmitter power, antenna tilt, radio resource control information, handover attempts, collisions, and other parameters. The network graph is stored in a graph database, and is processed by one or more network graph model inference modules which apply one or more specially-trained artificial intelligence (AI) models to the network graph to generate an optimized version of the network graph that can be utilized to improve the telecommunications network. A modeling visualization interface is also provided, and allows users of the system to visualize modeling and optimization performed by the system.

26 Claims, 24 Drawing Sheets

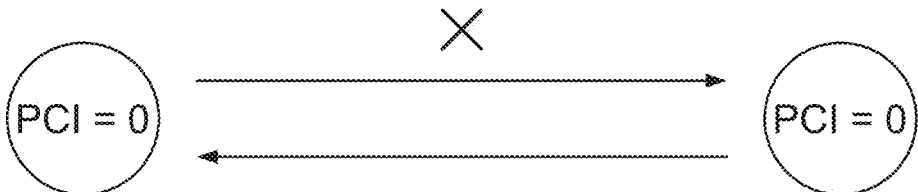
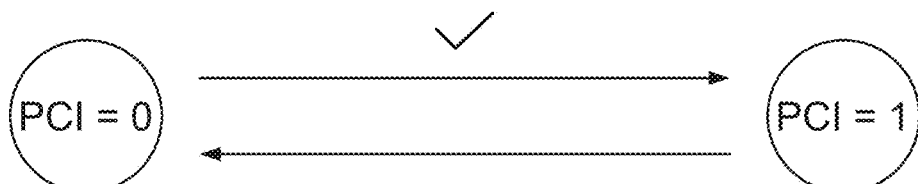
FIG. 13A
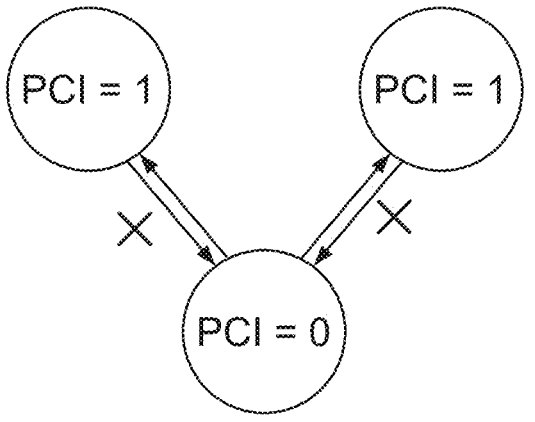
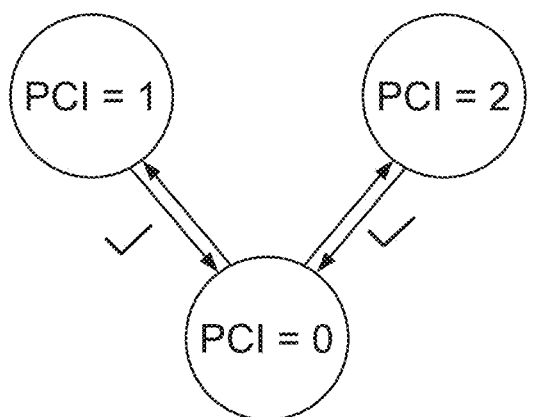
FIG. 13B

| | | | | Interferer | | | |
|---|---|---|---|---|---|---|---|
| | | N1 | B1 | N3 | N4 | A3 | N6 |
| BestServer | A1 | 1.3 | 2 | 9.7 | 34 | 24.2 | 0.67 |
| | A2 | 0.56 | 6.7 | 8.56 | 9.7 | 0.34 | 15.4 |
| | A3 | 12.4 | 4.8 | 19 | 0.3 | 0 | 0.22 |
| | B1 | 3.4 | 0 | 6 | 24.6 | 18.45 | 2.87 |
| | B2 | 10.8 | 4 | 7.8 | 45.5 | 11.5 | 6.98 |
| | B3 | 4.3 | 13.5 | 17.6 | 5.6 | 25.4 | 28.3 |

PCI = 0

10938/10938 [==============================] - 97s 9ms/step - loss: 4.7244e-04 - accuracy: 0.9999 - val_loss: 6.2791e-04 - val_accuracy: 0.9998

FIG. 18

Epoch 50/50
1563/1563  [==============================] - 26s 17ms/step -
loss: 0.0116 - accuracy: 0.9961 - val_loss: 0.0160 - val_accuracy: 0.9949

FIG. 19

```
# Use the classifier to evaluate the generated graph
pred_labels = classifier([x_decoded, adjacency_matrix])

# Calculate the reward based on the percentage of nodes classified as 0
(no issues) reward = tf.reduce_mean(1.0 - pred_labels)  # Higher reward
for fewer issues (more 0s)
```

FIG. 20

Cell A: Causing Confusion
PCI = 0
# of Neighbors = 35
[41. 25. 25. 35. 22. 22. 25. 25. 25. 22. 16. 32. 25. 24. 24. 31. 16. 12.
16. 19. 19. 35. 16. 16. 25. 25. 25. 15. 15. 15. 0. 0. 0. 13. 13. 13.
12. 12. 16. 28. 28. 28. 12. 12. 12. 0. 0. 0. 34. 34.]
Cell B: Not Causing Confusion
PCI = 48
# of Neighbors = 35
[41. 25. 25. 35. 22. 22. 25. 25. 25. 22. 16. 32. 25. 24. 24. 31. 16. 12.
16. 19. 19. 35. 16. 16. 25. 25. 25. 15. 15. 15. 0. 0. 0. 13. 13. 13.
12. 12. 16. 28. 28. 28. 12. 12. 12. 0. 0. 0. 35. 34.]
FIG. 21

Cell A: Causing Confusion
PCI = 0
# of Neighbors = 35

⇩

```
[17.142857  0.        0.        0.        0.        0.        0.
 0.         0.        0.        0.        0.        0.        0.
 0.         0.        0.        0.        0.        0.        0.
 0.         0.        0.        0.        0.        0.        0.
 0.         0.        0.        0.        0.        0.        0.
 0.         0.        0.        0.        0.        0.        0.
 0.         0.        0.        0.        0.        0.        0.
 0.         ]
```

Cell B: Not Causing Confusion
PCI = 48
# of Neighbors = 35

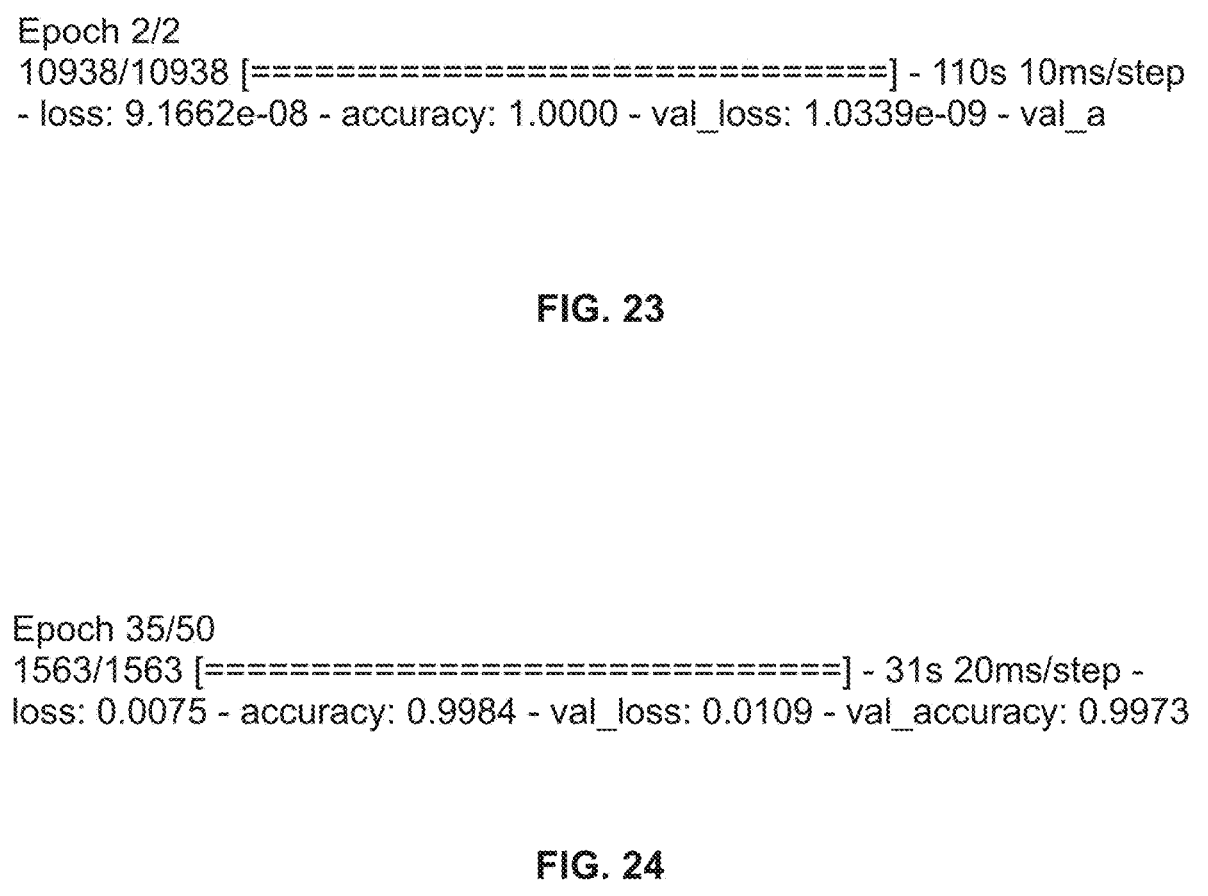

Epoch 2/2
10938/10938 [==============================] - 110s 10ms/step
- loss: 9.1662e-08 - accuracy: 1.0000 - val_loss: 1.0339e-09 - val_a

FIG. 23

Epoch 35/50
1563/1563 [==============================] - 31s 20ms/step -
loss: 0.0075 - accuracy: 0.9984 - val_loss: 0.0109 - val_accuracy: 0.9973

FIG. 24

Cell A: Causing Confusion
PCI = 0
# of Neighbors = 35

```
def reparameterize(z_mean, z_log_var) :
        epsilon = tf.random.normal(shape=tf.shape(z_mean))
        return z_mean + tf.exp(0.5 * z_log_var) * epsilon
```

FIG. 26

```
def compute_loss(self, x, reconstructed, z_mean, z_log_var) :
    reconstruction_loss = tf.reduce_mean(
        tf.keras.losses.sparse_categorical_crossentropy (x, reconstructed)
    )
    kl_loss = -0.5* tf.reduce_mean(
        1 + z_log_var - tf.square (z_mean) - tf.exp(z_log_var)
    )
    return reconstruction_loss + kl_loss, reconstruction_loss, kl_loss
```

FIG. 28

```
def train_step(self, data):
    (x, a, cond), _ = data  # Unpack data
    with tf.GradientTape() as tape:
        reconstructed, z_mean, z_log_var = self([x, a, cond], training=True)
        loss, kl_loss, reconstruction_loss = self.compute_loss(x, reconstructed,
        z_mean, z_log_var)
    gradients = tape.gradient(loss, self.trainable_variables)
    self.optimizer.apply_gradients (zip(gradients, self.trainable_variables))
    return {"loss": loss,
        "kl_loss": kl_loss,
        "reconstruction_loss" : reconstruction_loss} def test_step(self, data):
    (x, a, cond), _ = data  # Unpack data reconstructed, z_mean, z_log_var = self([x, a, cond], training=False)
    loss, kl_loss, reconstruction_loss = self.compute_loss(x, reconstructed, z_mean,
    z_log_var)

return {"loss": loss,
        "kl_loss": kl_loss,
        "reconstruction_loss" : reconstruction_loss}
```

FIG. 29

```
Epoch 94/100
3125/3125 [==============================] - 59s 19ms/step -
loss: 0.1108 - kl_loss: 0.0369 - reconstruction_loss: 0.0739 - val_loss:
0.1129 - val_kl_loss: 0.0416 - val_reconstruction_loss: 0.0713
```

FIG. 30

| Total_Cells | Total_Neighbor_Relations | Average_Neighbors_per_Cell | Minimum_Neighbors_Defined_on_Cell | Maximum_Neighbors_Defined_on_Cell |
|---|---|---|---|---|
| 72 | 1854 | 26.0 | 20 | 41 |

| Total_Cells | Total_Neighbor_Relations | Average_Neighbors_per_Cell | Minimum_Neighbors_Defined_on_Cell | Maximum_Neighbors_Defined_on_Cell |
|---|---|---|---|---|
| 1023 | 26238 | 26.0 | 20 | 62 |

MACHINE LEARNING SYSTEMS AND METHODS FOR COMPUTER MODELING AND OPTIMIZATION OF TELECOMMUNICATIONS NETWORKS

RELATED APPLICATIONS

The present application claims the benefit of U.S. Provisional Application Ser. No. 63/720,370 filed on Nov. 14, 2024, the entire disclosure of which is expressly incorporated herein by reference.

BACKGROUND

Technical Field

The present disclosure relates generally to the fields of machine learning and computer modeling. More specifically, the present disclosure relates to machine learning systems and methods for computer modeling and optimization of telecommunications networks.

RELATED ART

The complexity of modern telecommunications networks, with their vast data flows and increasing demands, has outgrown traditional methods of network management. Techniques that rely on manual intervention and static configurations are no longer sufficient to handle the dynamic nature of these advanced networks. Current self-organizing network (SON) approaches, while useful in managing certain aspects of automation and optimization, are limited in their ability to keep pace with the scale and sophistication of today's network environments.

With the advent of 5G networks, the scale, complexity, and scope of telecommunications networks have grown dramatically. These networks now operate across multiple frequency bands and layers of technology, supporting millions of connected devices and requiring ever-increasing data capacity. The quality of service (QoS) expectations of network users has risen dramatically, driven by the promise of 5G's enhanced capabilities and seamless connectivity. As these networks continue to expand, the sheer volume of data and the complexity of infrastructure have become significant barriers to efficient operation, leading to suboptimal resource use and increased costs. 5G technology opens the door to a range of innovative applications and services, making it more crucial than ever to efficiently manage, maintain, and orchestrate the network.

Telecommunications networks generate vast amounts of highly complex data, with intricate relationships between various components. To make network configuration decisions effectively, it is essential to capture and understand all aspects of this data. The effectiveness of the learning process depends heavily on how the data is modeled—an inadequate model can severely hinder learning and limit the potential for meaningful insights. A well-constructed data model is crucial to enabling intelligent network learning and achieving optimal model performance.

Deep learning is a type of machine learning based on artificial neural networks that have multiple neural layers that process information to extract progressively higher-level features from data. With its ability to process and learn from massive datasets, deep learning can identify patterns and insights that are beyond the reach of traditional approaches. By embedding AI-driven components directly into the network management fabric, telecommunications networks can become more intelligent, adaptive, and efficient, significantly improving both QoS and resource utilization.

Accordingly, what would be desirable, but have not yet been provided, are machine learning systems and methods for computer modeling and optimization of telecommunications networks which address the foregoing and other needs.

SUMMARY

The present disclosure relates to machine learning systems and methods for computer modeling and optimization of telecommunications networks. The system processes information relating to a telecommunications network, such as a cellular telephone network, and generates a directed network graph that represents the network as a series of connected edges and nodes with associated attributes such as transmitter power, antenna tilt, radio resource control information, handover attempts, collisions, and other parameters. The network graph is stored in a graph database, and is processed by one or more network graph model inference modules which apply one or more specially-trained artificial intelligence (AI) models to the network graph to generate an optimized version of the network graph that can be utilized to improve the telecommunications network. A modeling visualization interface is also provided, and allows users of the system to visualize modeling and optimization performed by the system. Additionally, the system can interface with other computer systems/devices using one or more customized Application Programming Interfaces (APIs).

BRIEF DESCRIPTION OF THE DRAWINGS

The foregoing features of the invention will be apparent from the following Detailed Description of the Invention, taken in connection with the accompanying drawings, in which:

FIG. 13A is diagram illustrating planning of a cell's physical cell identity (PCI) with and without conflict;

FIG. 13B is a diagram illustrating planning of a cell's PCI with and without confusion;

FIG. 16 is a diagram illustrating a PCI value of 0 represented as a one-hot vector of length 50;

FIG. 17 is a diagram illustrating an aggregated PCI vector with multiple instances of repeated values, indicating confusion;

FIG. 18 illustrates training results of a binary vector classifier model;

FIG. 19 illustrates training results of a GAT PCI confusion classifier model;

FIG. 20 is a diagram illustrating a PCI confusion reward function;

FIG. 21 is an illustration operation of two cells each with 35 neighbors;

FIG. 22 is a diagram illustrating the same example as FIG. 21, with further refinement logic applied in accordance with the systems and methods of the present disclosure;

FIG. 23 is a diagram illustrating training results of a PCI issue vector classifier model;

FIG. 24 is a diagram illustrating training results of a GAT PCI issue classifier model;

FIG. 25 is a diagram illustrating a resulting PCI feature vector after two layers of message passing in a network graph in accordance with the systems and methods of the present disclosure;

FIG. 26 is diagram illustrating reparametarization software code in accordance with the present disclosure;

FIG. 28 is a diagram illustrating software code in accordance with the present disclosure for training a CVAE using a custom loss function;

FIG. 29 is a diagram illustrating software code in accordance with the present disclosure for training and testing a CVAE;

FIG. 30 is a diagram illustrating training results of a CVAE PCI plan generator model;

DETAILED DESCRIPTION

Figure 1:
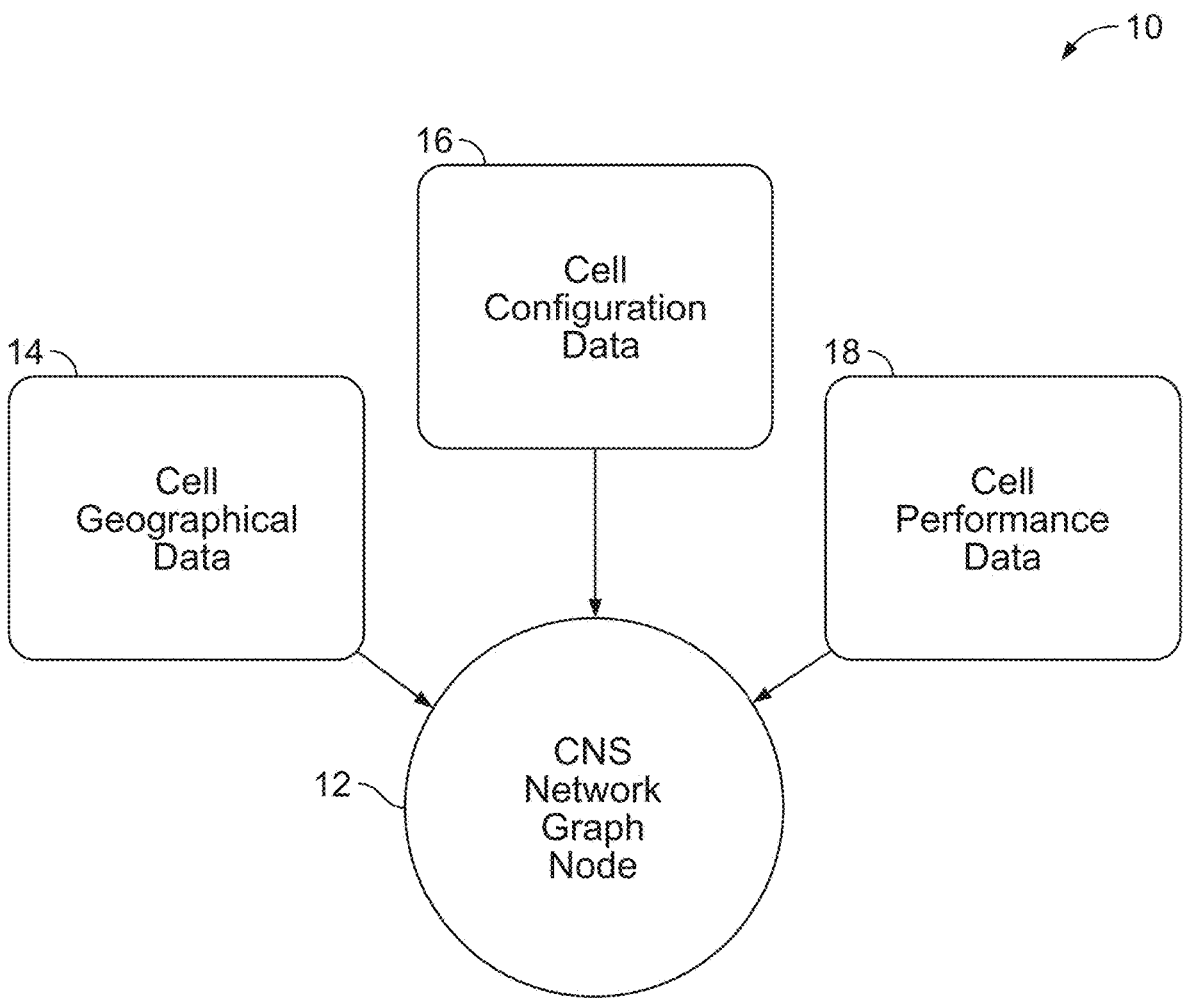
FIG. 1 is a diagram illustrating data and graph node components in accordance with the systems and methods of the present disclosure.

The present disclosure relates to machine learning systems and methods for computer modeling and optimization of telecommunications networks, as described in detail below in connection with FIGS. 1-35.

The machine learning systems and methods of the present disclosure provide a graph-centric deep learning framework that can analyze the unique structures of telecommunications networks and leverage generative artificial intelligence (AI) to create an intelligent, adaptive system. The systems and methods described herein allow a communications network to continuously learn from historical data and constant feedback, evolving its decision-making processes over time. By incorporating true learning capabilities, the systems and methods herein allow for the creation of a new, fully-realized, self-organizing network (SON), allowing for intelligent network automation and optimization. At the same time, this technology lays the foundation for future applications and advancements in RAN orchestration across more centralized and virtualized RAN architectures, including Centralized RAN (C-RAN), Virtual RAN (vRAN), and Open RAN (O-RAN).

At first glance, telecommunications ("telecom") network data—such as performance metrics, configuration settings, user activity, etc.—might appear similar to other types of large-scale data generated in complex systems. This could lead to the assumption that effective learning can be achieved by simply collecting the data, organizing it into tables, performing data preprocessing techniques, and applying traditional machine learning algorithms. However, telecom network data has unique characteristics that must be considered before meaningful learning can occur.

An important characteristic of a telecom network is that it possesses an inherent structure. The network is an interconnected entity with established relationships, dependencies, and influences among its individual components. When changes occur in one part of the network—whether through a configuration update or an operational disruption—these changes ripple across neighboring elements, directly affecting the performance of nearby network nodes. This impact is already well understood in telecom and doesn't need to be relearned by any machine learning model. Instead, the systems and methods disclosed herein incorporate this known structure directly into the data model, allowing the learning network to build upon these inherent relationships, focusing on discovering more complex or hidden patterns within the data and adapting to the dynamic behavior of the network.

Interaction between users and network components are also driven by proximal relationships, as the primary function of a telecommunications network is to deliver connectivity across defined geographical areas. Due to these characteristics, the entire Radio Access Network (RAN) ecosystem is inherently non-Euclidean, featuring complex and irregular relationships that traditional relational data models cannot effectively capture. One solution to capturing these complex relationships is to model the data as a mathematical graph. A graph is a mathematical data structure that consists of a set of nodes (or vertices), V, and a set of relationships (or edges) between those nodes, E. The graph itself is the combination of these two sets, $G=(V,E)$. Graphs can be directed (with a specified direction for interactions) or undirected, and edges can be weighted to identify the unique properties of each relationship. Telecom networks can be considered dynamic graphs, where nodes and edges evolve as network conditions change. A graph data model in accordance with the systems and methods of the present disclosure captures these complex relationships, preserving key information for advanced network learning and optimization.

By modeling the network as a graph, the systems and methods of the present disclosure represent the natural structure of the network, where each element is a node and each interaction or relationship is an edge. This approach preserves all the critical information that would otherwise be lost in traditional, non-graph-based formats. The graph model captures the inherent relationships within the network, allowing for more accurate and insightful learning from the data.

FIG. 1 is a diagram illustrating data and graph node components in accordance with the systems and methods of the present disclosure, indicated generally at 10. The systems and methods of the present disclosure generate a network graph modeling node 12, which models cell geographical data 14-18. The graph modeling node 12 focuses on the interactions between network cells within each deployed base station, specifically capturing how these elements communicate through defined network interfaces. While the core structure of the graph modeling node 12 remains consistent, the specific parameters for the nodes and edges can be adapted based on the problem being addressed. This flexibility allows the graph modeling node 12 to be as simple or complex as needed, ensuring it accurately reflects the network's dynamics while remaining adaptable for various use cases.

In the graph model 10, the nodes of the graph are modeled to represent the individual cells within each eNodeB (eNB) and gNodeB (gNB). These cells, which serve as the fundamental units of the network, are always associated with a specific technology, frequency, and defined geographical area within the deployed network. Each cell has three components: geographical data representing the cell's physical location and coverage area (often associated with the broader cell site, and includes but is not limited to geographical coordinates, sector azimuth, and the RAD center (center of radiation)); configuration data representing the cells operational parameters that allow the cell to function as an active element in the network (this data can include, but is not limited to, power settings, antenna tilt, frequency band, Physical Cell Identity (PCI), and licensed feature settings that operate on a cell level); and performance data representing cell level performance metrics that capture the overall experience the users of the network have when connected to that cell (this data includes, but is not limited to, traffic load, PRB (physical resource block) utilization, signal quality, throughput, and voice experience). The terms "cell level performance" and "user experience on a cell" are used herein interchangeably, such that reference to cell level performance means looking at the network-side metrics. This perspective focuses on how the network measures the performance of the cell, typically as an aggregate of all user activity and data usage, rather than what each user experiences individually.

All data from the previously mentioned categories can be represented as distinct attributes of the nodes in the network graph node 12. Each graph node 12 is uniquely identified either by the cell's ECI/NCI or by the readable cell ID assigned by the operator, based on any established naming convention. This identifier is part of the configuration data set. Regardless of which identifier is used, the graph node 12 mirrors the cell's identity within the actual telecom network, ensuring a seamless 1-to-1 mapping between the telecom network's structure and the graph data model.

Figure 2:
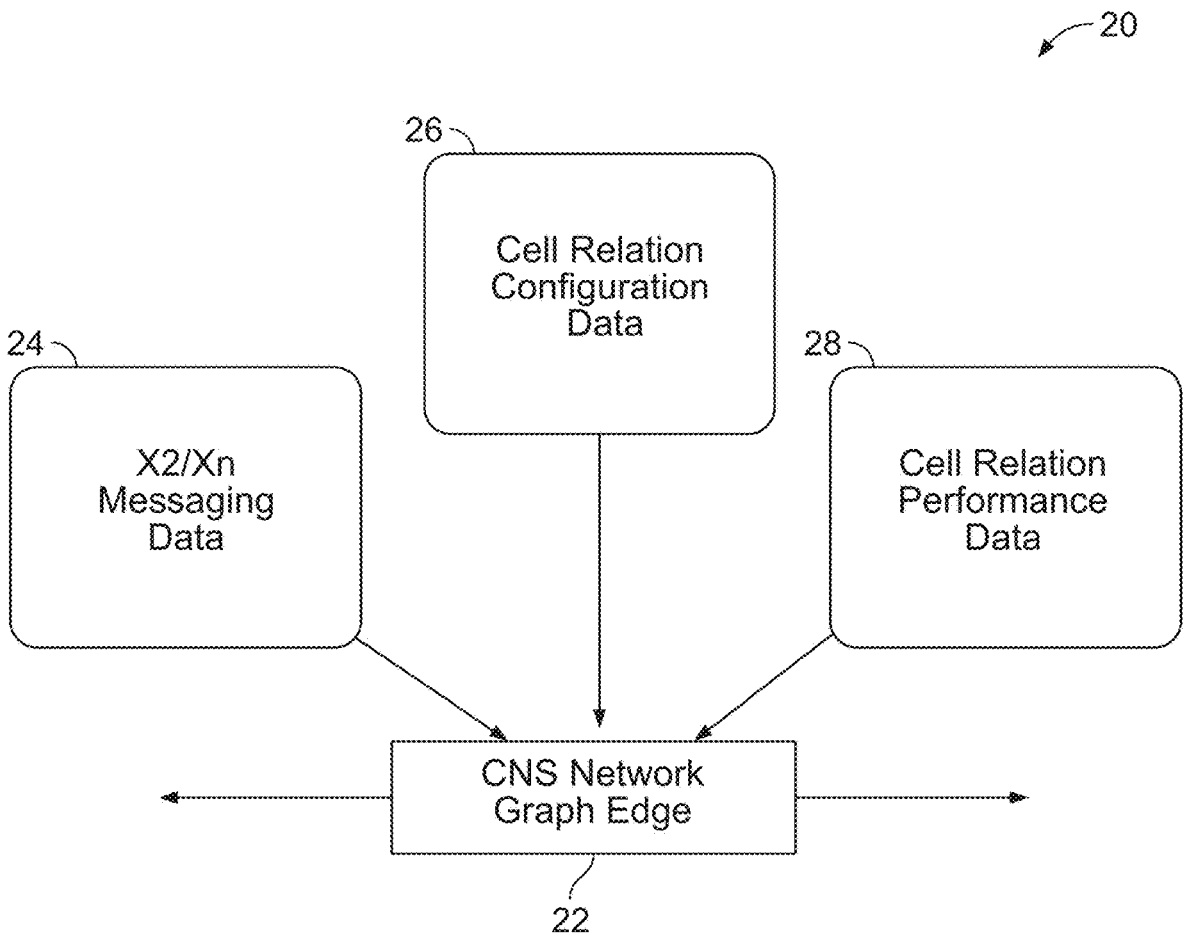
FIG. 2 is a diagram data and graph edge components in accordance with the systems and methods of the present disclosure.

FIG. 2 is a diagram of data and graph edge components in accordance with the systems and methods of the present disclosure. The systems and methods of the present disclosure can generate a network graph edge 22 based on X2/Xn messaging data 24, cell relation configuration data 26, and cell relation performance data 28. The X2 messaging data corresponds to Long-Term Evolution (LTE) cell interfaces and the Xn messaging data corresponds to 5G NR interfaces, and the network graph edge 22 captures cell relations that define interactions between neighboring cells. These elements work together to facilitate efficient cell-to-cell communication and enable handovers, load balancing, and other coordination activities as part of the broader base station operations. The cell relations are directly tied to the X2/Xn interfaces and hold the critical configuration parameters that govern mobility, handovers, and load balancing for each cell, making them fundamental to managing user movement across the network. In addition to configuration data, cell relations track relation-level key performance indicators (KPIs) such as handover success rates and signal quality metrics providing real-time insights into network performance. While the X2/Xn interfaces enable the physical communication between cells, its the cell relations define the logic and control behind those interactions, ensuring seamless mobility and efficient network coordination.

The X2 and Xn interfaces are the pathways that enable communication between individual cells within base stations (eNodeBs in LTE, gNodeBs in 5G). These interfaces allow both signaling and user plane data to be sent/received without routing through the core network. In contrast, the S1 interface in LTE connects base stations to the MME (Mobility Management Entity) in the core network for mobility and session management, while in 5G NR, the N2 interface replaces S1, connecting to the AMF (Access and Mobility Management Function). These interfaces are typically used for more significant mobility events, such as initial UE registration or Tracking Area Updates (TAU). Since the X2/Xn interfaces facilitate direct cell-to-cell communication, it makes more sense to model the edges between cell nodes based on these interfaces, rather than the S1/N2 interfaces, which involve communication through an intermediate core node.

Each cell has a defined set of neighbor relations within its corresponding eNB or gNB, where the cell is managed. This neighbor list is typically configured and maintained by Automatic Neighbor Relations (ANR) algorithms within the network, ensuring that each X2/Xn interface and its corresponding cell relations are properly set up and functioning. Without these defined neighbors, UE (User Equipment) would be unable to perform connected mode mobility actions, such as handovers, from one cell to another. Telecom networks already have a set of explicit communication interfaces and neighbor relationships defined as part of their normal operations, which means the graph edges in the network graph edge 22 are a 1-to-1 mirror of the real network's structure and functionality. These graph edges precisely reflect the actual connections between cells in the live network, ensuring that the model of the present invention aligns with how handovers, mobility, and cell-to-cell interactions occur in reality.

Figure 3:
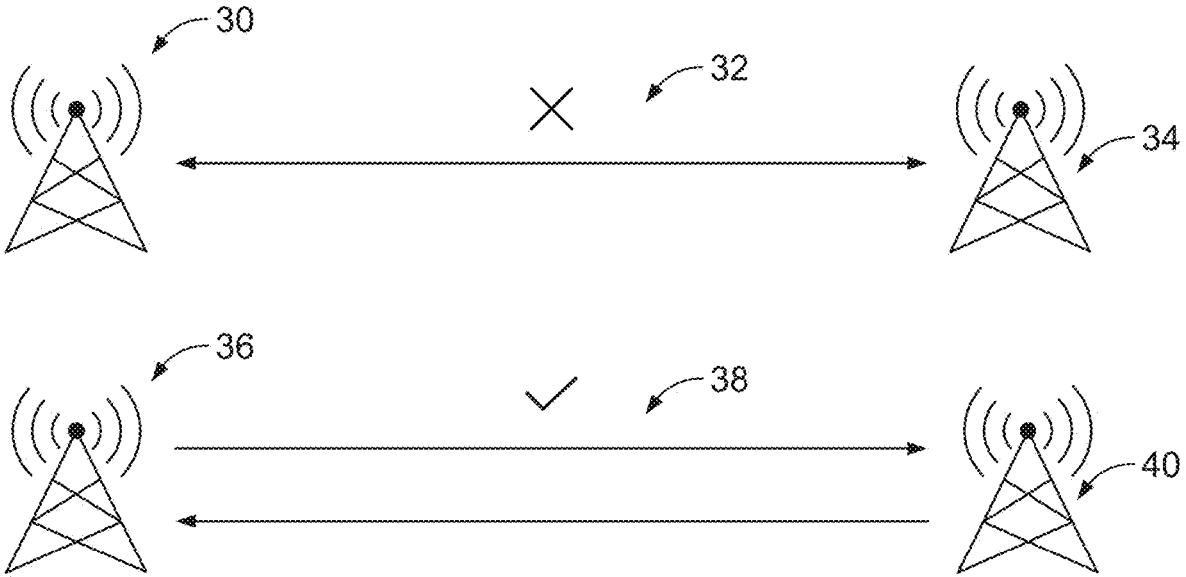
FIG. 3 is a diagram illustrating cell edge directionality.

FIG. 3 is a diagram illustrating cell edge directionality. Cell networks can be model as undirected graphs, such as the undirected graph 32 between two cells 30, 34, and as directed graphs, such as directed graph 38 between cells 36, 40. It's essential to model the network graph to reflect the exact flow of operations within the network. Since handovers can occur in both directions between cells, one might initially think that using an undirected graph 32 would be a simpler and more conceptually fitting choice. However, this approach would fail to capture the true nature of how wireless networks operate. Each handover starts at a source cell and ends at a target cell, meaning the process is directional and flows in only one direction at a time. For cells defined in a network, cell relations are defined and tied to a cell object with the cell itself as the source and its neighboring cells as targets. Even though the reverse direction needs to exist for every source-to-target relationship, that will always be defined as a separate managed object associated with another specific cell. This is true for all cells in the network. Thus, undirected graphs are insufficient for modeling these relationships because they do not account for this distinction between source and target. By using separate directed edges 38 for each source-to-target relationship, the system can model all edges exactly as they would occur in practice. This allows the system to accurately capture scenarios where neighbor relations might only exist in one direction or where relation-specific parameters differ depending on the direction.

Figure 4:
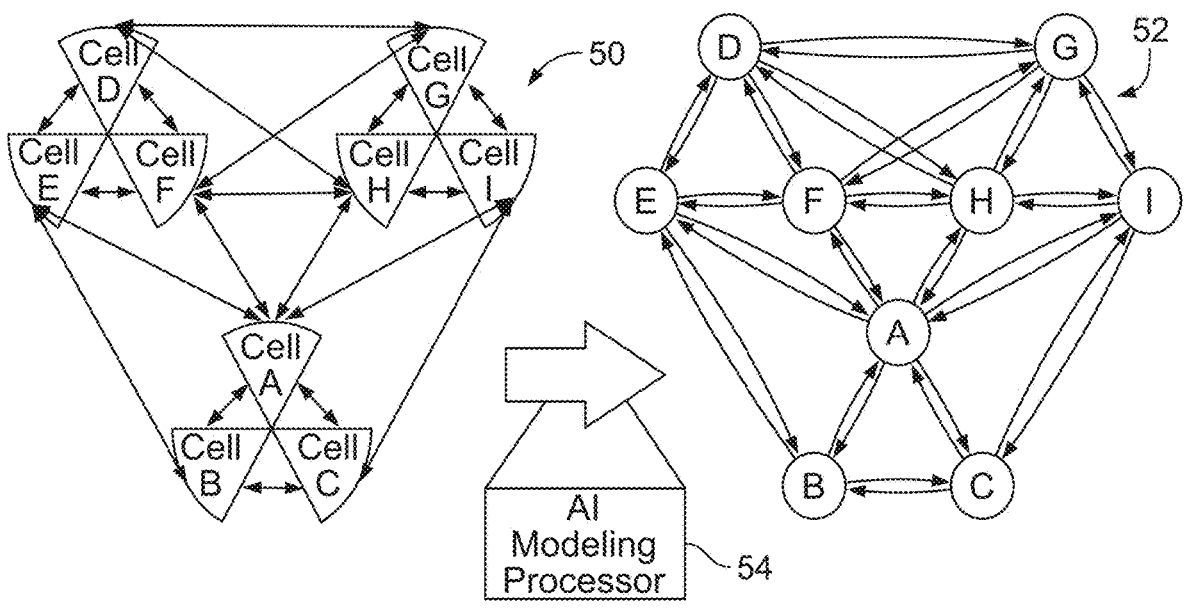
FIG. 4 is a diagram illustrating modeling by the systems and methods of the present disclosure of a cluster of cells.

FIG. 4 is a diagram illustrating modeling by the systems and methods of the present disclosure of a cluster of cells. The system includes an AI modeling processor 54 (which could be embodied as non-transitory, computer-readable instructions programmed into and executed by a processor such as, but not limited to, a computer system, a server, a cloud processing platform, a mobile device, a tablet computer, a graphics processing unit (GPU), a central processing unit (CPU), a tensor processing unit (TPU), a microprocessor, a microcontroller, a field-programmable gate array (FPGA), etc.) which processes information relating to a cluster 50 of cell sites and generates a graph model 52 corresponding to the cluster 50 of cell sites. The resulting graph model 52 can capture the full scope of a radio access network (RAN), modeling not only each individual cell but also the cell-to-cell relationships and the underlying communication interfaces. With this graph model in place, the system can leverage advanced analytical techniques to uncover patterns in network behavior, predict performance bottlenecks, and optimize processes such as handovers and resource allocation. Additionally, the graph model 52 enables more accurate simulation of network scenarios, helps identify areas for improvement, and drives intelligent automation. Ultimately, this data model lays the foundation for a truly learning network, capable of adapting and improving itself over time through continuous feedback and advanced AI-driven techniques. The graph model 52 accurately depicts the functioning relationships between the cells of the cluster 50, using directional edges.

Figure 5:
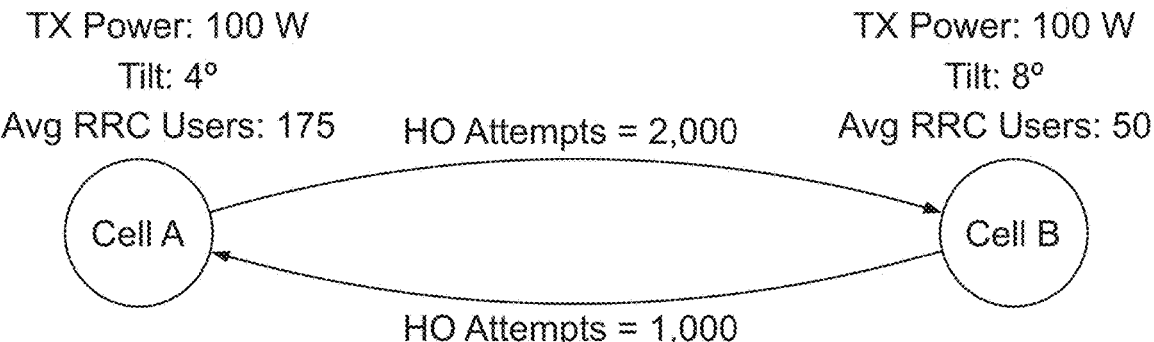
FIG. 5 is a diagram illustrating two cell sites and their relationship with corresponding network data.

FIG. 5 is a diagram illustrating two cell sites and their relationship with corresponding network data. The cells A and B are modeled by the systems and methods of the present disclosure as nodes that have associated operating characteristics such as transmitter power (e.g., expressed in watts), antenna tilt (e.g., expressed in degrees), and average radio resource control (RRC) users. The relationships between cells A and B are modeled as directional edges between the cell nodes A and B, indicating the number of hand-over (HO) attempts between cells A and B in opposite directions (2,000 HO attempts are modeled in FIG. 5 as a directional edge between cell A and B, and 1,000 HO attempts are modeled in FIG. 5 as a directional edge between cell B and A, but of course, other edge numbers and/or parameters can be modeled).

In order to feed graph data into machine learning models, is is necessary to represent its components in matrix form. There are three key matrices are used by the systems and methods of the present disclosure to represent graph data in this form:

Node Feature Matrix: This matrix, typically represented by variable X, represents the attributes (features) of each node in the graph. For a graph with N nodes, each having F features, the resulting node feature matrix has shape N×F. Each row of the matrix represents the feature vector of a single node.

Edge Feature Matrix: If edge features are used, they are stored in an edge feature matrix denoted by variable E. For a graph with E edges, each having F features, the resulting edge feature matrix has shape E×F. Each row of the matrix is a vector representing the features of a specific edge between two nodes.

Adjacency Matrix: An adjacency matrix is a square matrix of shape N×N used to represent the present connections within a graph data structure, represented by variable A. The rows and columns correspond to the nodes of the graph, and the entries in the matrix indicate whether there is an edge between pairs of nodes: if two nodes are connected, the corresponding entry in the matrix is 1 (or some other weighted value); if two nodes are not connected, the corresponding entry is 0.

For an undirected graph, the adjacency matrix is always symmetric. For a directed graph, it can be asymmetric because edges have directionality. A sample adjacency matrix is provided below:

$$A = \begin{pmatrix} 0 & 1 & 0 & \dots & 0 \\ 1 & 0 & 1 & \dots & 0 \\ 0 & 1 & 0 & \dots & 1 \\ \vdots & \vdots & \vdots & \ddots & \vdots \\ 0 & 0 & 1 & \dots & 0 \end{pmatrix}$$

The systems and methods of the present disclosure formulate telecommunications data as a graph because such a data model is designed to fully leverage the capabilities of Graph Neural Networks (GNNs). GNNs are uniquely suited to learn from graph-based data, as they can capture not only the properties of individual elements but also the relationships and interactions between them. In a telecom context, where network performance is highly dependent on the interplay between neighboring cells, GNNs provide a powerful way to learn from and optimize these complex interactions.

In addition to graph-based learning, generative AI plays an important role by enhancing the system's ability to apply learned insights to new, unseen situations. While GNNs excel at capturing relationships and learning the structure of the network, incorporating generative AI models allow the system to construct a rich latent space a learned distribution that represents network behaviors and patterns. From this latent space, the network models of the systems and methods of the present disclosure can generate new scenarios, predictions, or suggestions based on what they have learned, even for conditions they have not explicitly encountered. This enables the framework to move beyond simply reacting to current data, proactively suggesting optimizations and anticipating potential challenges. In essence, generative AI allows the system to truly learn from the data and apply that knowledge in dynamic, evolving ways.

By combining a GNN's ability to learn, understand, and leverage the network's graphical structure with generative AI's predictive and proactive capabilities, the CNS AI framework has the ability to surpass many traditional network automation approaches. It will enable the network to continuously adapt and improve while anticipating future challenges, ensuring smarter, more informed network management that integrates human-like intelligence faster and at scale.

Unlike traditional machine learning models, which primarily learn from isolated features, GNNs learn from both the nodes (e.g., individual cells) and the edges (the connections or interactions between them). GNNs go beyond simply capturing these relationships they learn directly through the edges using a process called message passing. This enables GNNs to propagate information across neighboring nodes in the graph, effectively capturing critical details from the local neighborhood of each cell, including how changes in one cell can impact the performance of others. The systems and methods of the present disclosure perform advanced network learning by combining two powerful GNN architectures: Message Passing Neural Networks (MPNNs) and Graph Attention Networks (GATs).

The MPNNs utilized by the systems and methods include the following three components:

1. Message Function: This component compiles a message vector for each connection (edge) between two cell nodes by combining the features of the source node and additionally conditioning that vector on edge features if available.
2. Aggregate Function: This component aggregates all incoming messages to a particular cell by summing, averaging, or otherwise combining them to form a composite message vector that captures the information from all its neighbors.
3. Update Function: This component updates the cell's feature vector with the new aggregated representation of the local neighborhood.

Typically, each of these components may incorporate a small Multi-Layer Perceptron (MLP) layer, introducing non-linearity and tunable weights into the MPNN computations. Since the concept of message passing and interactions between elements is so fundamental to live networks, the systems and methods herein ensure that the models first learn how to interpret and process a network structure based on core principles and best practices. This direct control over message passing, aggregation, and updates allows the system to embed domain knowledge directly into MPNN models.

Figure 6:
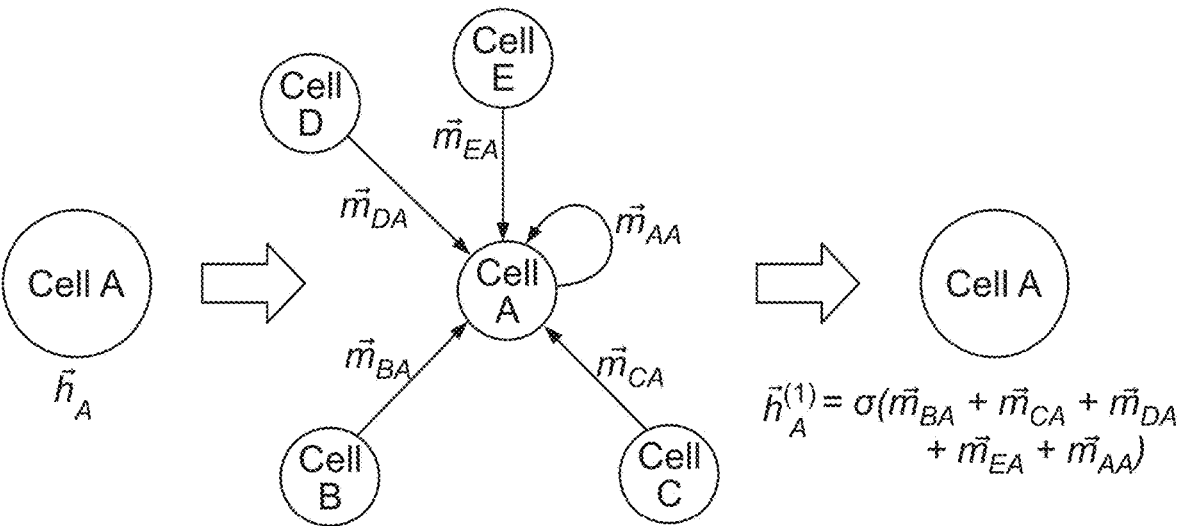
FIG. 6 is diagram illustrating aggregation of messages from neighboring cells using a message passing neural network (MPNN)

FIG. 6 is diagram illustrating aggregation of messages from neighboring cells using a message passing neural network (MPNN). As shown, Cell A aggregates messages from neighboring cells B-E using an MPNN. The messages are summed and passed through an activation function σ( ), producing the update feature. These aggregated messages are passed through an activation function, often a small MLP with trainable weights. This process results in a composite feature vector for Cell A, capturing the influence of its neighbors. Simultaneously, every other cell in the network graph undergoes the same process in parallel, producing an enhanced representation for the entire graph. The functions illustrated in FIG. 6 and described herein could be performed by the AI modeling processor 54 of FIG. 4, discussed above.

The example of FIG. 6 depicts only a single layer of message passing, but more layers can be applied depending on the problem to be solved. Each additional layer captures broader relationships, from second-tier neighbors to, third-tier, fourth-tier and beyond. It is important to avoid over-smoothing the graph, which can obscure meaningful distinctions between nodes. Maintaining the uniqueness of local neighborhoods is crucial, especially in telecom networks where no two areas are exactly alike. The systems and methods of the present disclosure ensure that local variations are preserved, allowing the model to learn from the distinct characteristics of each network region.

While MPNNs are the one of the most powerful GNN architectures, they come with certain limitations. The primary challenges is the computational overhead during inference, where every message from the neighboring nodes needs to be explicitly computed and aggregated. As the size of the network increases, so does the number of messages that need to be processed, leading to memory inefficiencies and slower execution times even when running on accelerated hardware. As a result, if desired, the MPNN models of the present disclosure can be used as an intermediate step to train scalable GAT models.

GAT models introduces attention coefficients along edges that provide different weights to neighboring nodes based on their influence on the current node. These coefficients are computed implicitly through the use of a shared neural network often called a self-attention mechanism. Unlike MPNNs, which must compute a full message vector for each neighbor, GATs compute a single scalar value per edge, significantly reducing memory requirements while still determining neighbor influence effectively. GAT models calculate the attention coefficients using the following steps:

1. Linear Transformation: Each node's feature vector is linearly transformed using a shared weight matrix, such as the following:

$$W \in \mathbb{R}^{F \times F}$$

2. Self-Attention Mechanism: A shared attention mechanism computes unnormalized attention scores for each neighboring node. These attention scores are specific to the local neighborhood of a node, meaning they are only computed for edges where the source node j is a first-tier neighbor of the target node i, using the following:

$$e_{ij} = a(W\vec{h}_i, W\vec{h}_j)$$

3. Normalization: These raw attention scores are then normalized by applying a softmax function, so they are easily comparable across different nodes, as follows:

$$\alpha_{ij} = \text{softmax}_j(e_{ij}) = \frac{\exp(e_{ij})}{\sum_{k \in N_i} \exp(e_{ik})}$$

Figure 7:
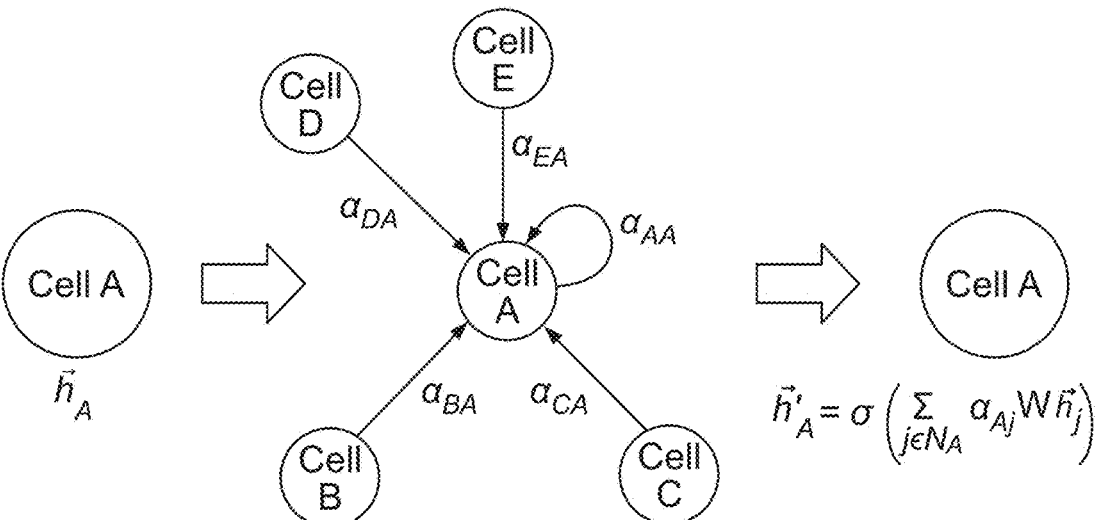
FIG. 7 is a diagram illustrating aggregation of messages from neighboring cells using a graph attention (GAT) network.

FIG. 7 is a diagram illustrating aggregation of messages from neighboring cells using a graph attention (GAT) network. As shown in FIG. 7, cell A aggregates messages from neighboring cells B-E, in this case using a GAT network. Cell A uses implicit attention coefficients instead of message vectors. These coefficients, combined with the shared weight matrix, are passed through a non-linear activation function to update Cell A's feature. The functions illustrated in FIG. 7 and described herein could be performed by the AI modeling processor 54 of FIG. 4, discussed above.

Figure 8:
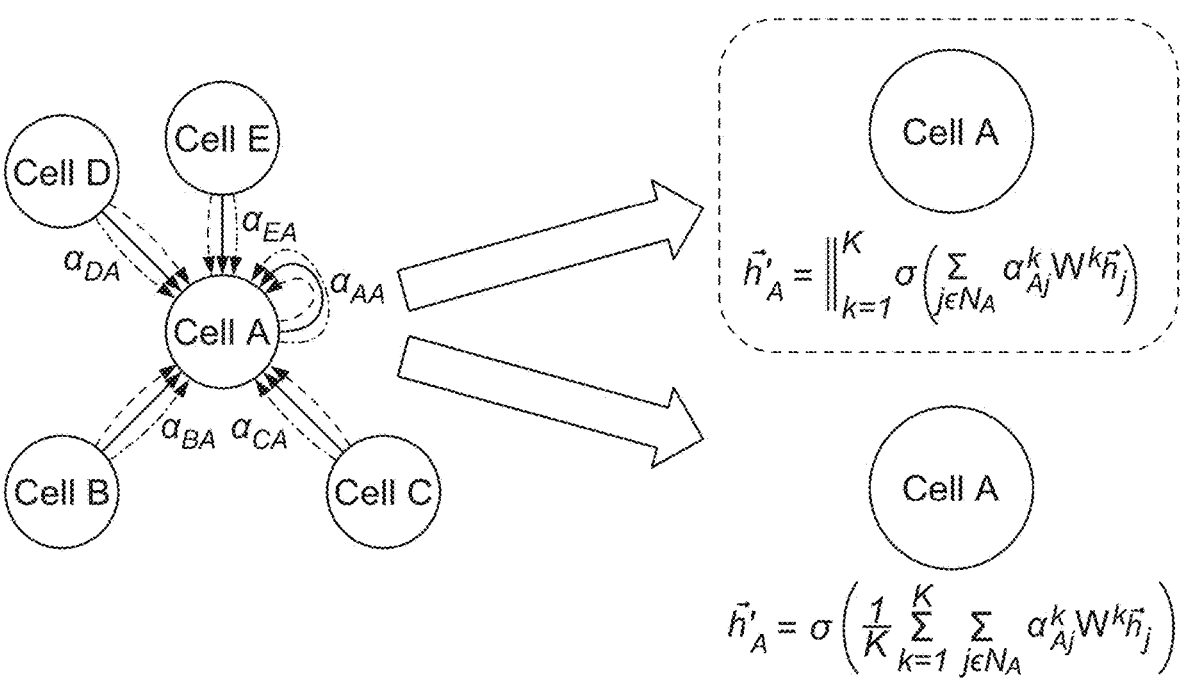
FIG. 8 is a diagram illustrating aggregation of message from neighboring cells using a multi-head attention mechanism.

The GAT model discussed herein could also implement CNS's GAT models leverage multi-head attention, as illustrated in FIG. 8. A key feature of this architecture is that it enables the computation of K independent attention mechanisms. Each attention head generates its own set of attention coefficients, allowing the model to capture different perspectives or aspects of the relationships between nodes. These attention heads are then combined into a single output feature vector in one of two ways:

1. Concatenation: The system concatenates the outputs from each attention head together into a robust vector of shape Output Features*Attention Heads, leading to a more diverse set of output features.
2. Averaging: The system averages the outputs of each attention head to reduce the dimensionality of the resulting output feature vector.

FIG. 8 is a diagram illustrating aggregation of message from neighboring cells using a multi-head attention mechanism. As can be seen, cell 8 employs a multi-head attention mechanism that uses either concatenation or averaging. Concatenation ensures richer representations of the data and its connectivity are retained in the internal layers. Since the GAT layers are usually not the final output, concatenation enables the model to capture more detailed patterns before passing information to the next stage. By utilizing the implicit attention mechanisms of GATs, the systems and methods herein dynamically assign different levels of importance to neighboring cells on a per-cell basis. Each cell learns how impactful its neighbors are in relation to itself, enabling the network to evaluate how changes in one cell influence the entire system. This ability allows for cluster-level learning without requiring explicit relation-level features, though the system integrates those features into training wherever beneficial.

One of the key advantages of GATs is their capacity for inductive learning they can generalize effectively to graph structures they haven't seen before. This means that even when a network cluster consists of a new configuration of cells and neighbors that the model hasn't encountered during training, the GAT-based model can still operate on that cluster effectively. This adaptability is beneficial for real-world telecom environments, where network topologies are constantly evolving and can vary between different regions.

In telecommunications, optimizing a Radio Access Network (RAN) involves not only finding an ideal set of network configurations, but also understanding why a particular network configuration is effective or why another might fall short under the same circumstances. This is why generative AI technology is a critical component of the CNS framework. As a result, generative AI architectures are utilized by the systems and methods of the present disclosure to capture the underlying nature of a telecom network in a probabilistic latent space, representing a range of possible network behaviors and outcomes. This probabilistic space is beneficial because it reflects the inherent uncertainty and variability in real-world networks, allowing the model to learn not just what solutions work, but why they work under different conditions. By leveraging this latent space, the system can be modeled predict the future state of the network, generating suggestions and scenarios it has never explicitly encountered during training. The systems and methods of the present disclosure accomplish this by utilizing the Variational Autoencoder (VAE) class of generative models. VAEs consist of two parts:

1. Encoder Network: The encoder transforms the input data into a compressed, lower-dimensional latent space. It maps high-dimensional input data into a latent representation. This process captures the most essential features of the data while removing redundancy and irrelevant details.

2. Decoder Network: The decoder takes samples from the latent space and generates realistic outputs, aiming to reconstruct data similar to the original input. It generates new data by sampling from the latent space distribution learned by the encoder.

Figure 9:
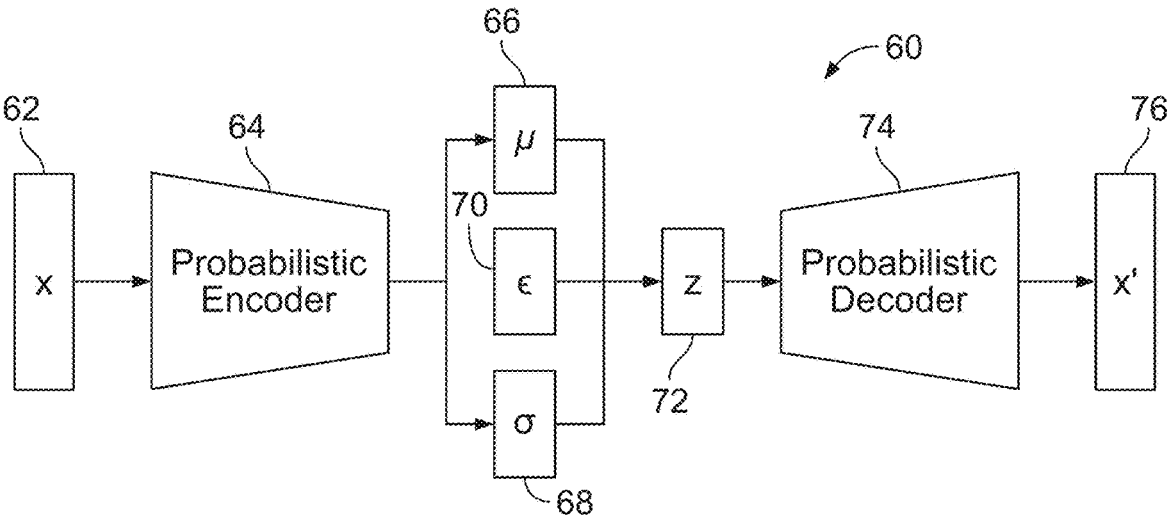
FIG. 9 is a diagram illustrating a variational autoencoder implemented by the systems and methods of the present disclosure.

FIG. 9 is a diagram illustrating a variational autoencoder implemented by the systems and methods of the present disclosure, indicated generally at 60. The autoencoder processes input 62 using a probabilistic encoder 64 to generate outputs 66-68, which are processed along with sampled noise variable 70 to generate transformation 72. The transformation 72 is then decoded using probabilistic decoder 74 to generate output 76. An important feature of this architecture is that VAEs incorporate a layer of stochasticity to the latent representation of the data. However, sampling from a probability distribution is inherently a non-differentiable operation, which prevents gradients from being computed and backpropagated during training. Without gradients, the model becomes untrainable. To combat this, the VAE architecture 60 utilizes a reparameterization technique. This technique, positioned between the encoder and decoder networks, enables the sampling process to be expressed in a differentiable way, facilitating the computation and backpropagation of gradients during training. The reparameterization is defined as follows:

1. Sample a random noise variable E from a fixed distribution (Gaussian, Dirichlet, etc.).
2. Transform the sampled noise variable c using the parameters of the posterior distribution. This transformation is defined as $z=\mu+\sigma\odot\in$. Both $\mu$ and $\sigma$ represent the mean and standard deviation of the posterior distribution respectively and are what the encoder network is designed to predict.
3. The reparametrized variable z becomes the new input to the decoder network. The sampling operation is now differentiable with respect to the encoder network, allowing gradients to flow.

Training a VAE involves optimizing two main objectives:

1. Reconstruction Loss: The primary goal of any autoencoder, including VAEs, is to reconstruct the input data as accurately as possible after compressing it into a latent representation. The reconstruction loss encourages the model to learn a latent space that can effectively generate realistic samples close to the input data. The goal is to minimize this value using specific loss functions such as Mean Squared Error or Binary Cross-Entropy Loss.

2. KL Divergence: The KL divergence is the measure of how much one probability distribution differs from another. In the case of a VAE, it is used to determine the difference between the probabilistic latent space and the prior distribution (the one used for the reparameterization process). This ensures the latent space aligns with the desired probabilistic structure, remaining regularized with desirable properties.

The goal of training is to jointly reduce both the reconstruction loss and the KL divergence. This way, the VAE learns to represent the input data efficiently and extracts meaningful samples during the generation process. After the VAE is trained, the decoder network can generate new samples by drawing from the learned latent space. Since the latent space has been structured to align with a prior distribution during training, the system can sample directly from this distribution. By feeding these latent vectors into the decoder, the network generates realistic data based on the patterns it learned from the original dataset.

Figures 10, 11:
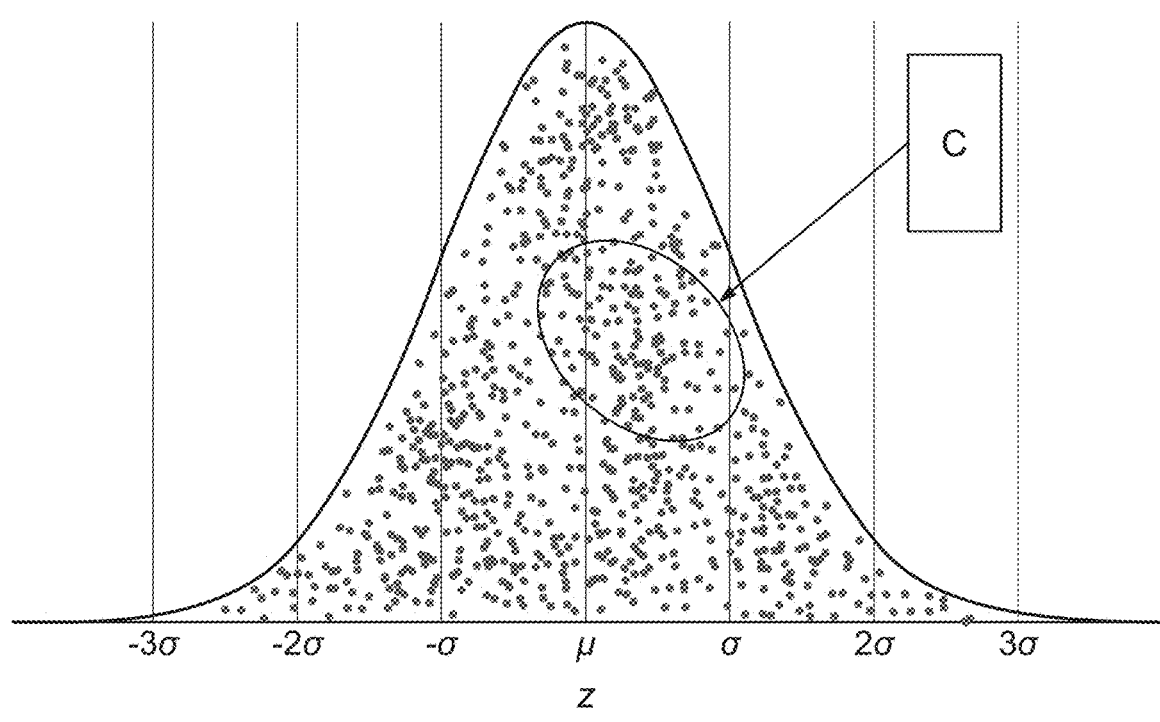
FIG. 10 is a graph illustrating latent distribution of a trained conditional variational autoencoder (CVAE) in accordance with the systems and methods of the present disclosure.
FIG. 11 is a diagram illustrating a graph-based CVAE model in accordance with the systems and methods of the present disclosure for telecommunications network learning.

FIG. 10 is a graph illustrating latent distribution of a trained conditional variational autoencoder (CVAE) in accordance with the systems and methods of the present disclosure. A goal of the systems and methods of the present disclosure is to predict the future states of a telecom network based on the learned latent representation of how these networks function. To that end, there is a set of initial network conditions on which a suggestion is based. This is why the system implements a unique variant of the VAE architecture called a Conditional Variational Autoencoder (CVAE). In a CVAE model, the latent space is conditioned on additional input variables, typically referred to as conditional variables. These conditional variables encode the specific attributes that are desired for the generated data to include. These conditional variables can be anything ranging from additional classifications or labels related to the original input features (such as network configuration types, cell tower locations, or traffic patterns) to partial features or incomplete data points. Essentially, any relevant contextual information that helps refine the predictions can be used as a condition.

When using the decoder network, the system can pass in the conditional variables along-side the latent variable z in order extract specific contextual knowledge from the overall latent space. By conditioning the latent representation, the system ensures that the generated outputs reflects the required context to perform specific optimization tasks. For example, if the system conditions the model on network congestion patterns, the CVAE will extract and sample from the part of the latent space that corresponds to similar historical congestion events, allowing it to generate solutions specific to that context. This ability to extract targeted regions of the latent space enables the system to make precise, context-aware predictions and optimizations for future network states. As shown in FIG. 10, the learned latent distribution of a trained CVAE is shown. A set of conditional variables c can be used to target a specific subset of knowledge for prediction generation.

FIG. 11 is a diagram illustrating a graph-based CVAE model in accordance with the systems and methods of the present disclosure for telecommunications network learning, indicated generally at 80. The model 80 takes as inputs the terms X (82), A (84), E (86) and c (88), which are processed by a GNN probabilistic encoder 90 and generate dense output layers 92 and 94. The dense output layers 92 and 94 are processed along with a sampled noise variable 96 to generate transformation 98. Transformation 98 and term c (88) are then processed by a GNN/MLP probabilistic decoder 100 to generate outputs X' (102), A' (104), and E' (106).

The model 80 incorporate one or more GAT layers as the encoder for the CVAE. The number of GNN layers used in the encoder depends on the desired depth of information propagation between cells—whether there is a desire for each cell to be aware of its second, third, or even fourth-tier neighboring cells. For each GAT layer, the system employs multiple attention heads, the outputs of which are concatenated into a single latent vector representing the network. To compute the $\mu$ and log $\sigma^2$, which are necessary for the latent space distribution, the system uses two learnable dense layers that transform the output of the GNN layers into these respective parameters. These dense layers also serve to reduce the dimensionality of the learned latent space, providing a more compact and informative representation.

Following the encoder 90, the system applies a reparameterization process which introduces stochasticity into the latent space by reparameterizing $\mu$ and log $\sigma^2$ into the latent variable z. This operation ensures that gradients can flow through the network during backpropagation, facilitating the learning process. The latent variable z is then passed to the decoder network 100, along with the conditional variables, as input.

The decoder network 100 can be constructed using any learnable neural network layer that extracts relevant features from the latent space, tailored to the dimensionality of the generated vector. The system can implement combinations of GNN and fully connected MLP layers as the decoder network 100. This choice introduces additional learnable parameters and provides the capacity to capture the complexity needed to reconstruct the input features from the latent space.

The framework illustrated in FIG. 11 is designed to be flexible and can support any GNN architecture that may be suited to learning from different attributes of the graph model of the systems and methods of the present disclosure. While a GAT encoder is the primary approach used, the architecture is not limited to this choice. Depending on the specific task or optimization goal, other GNN models, such as GraphSAGE, GCN, or ECCConv, can be easily integrated into the framework, providing adaptability to various use cases and data characteristics.

The combined CVAE model discussed in FIG. 11 can be trained to understand the underlying network structure and make relevant suggestions for optimizing telecom network performance, depending on different sets of initial conditions. It can be trained to generate data centered around cell-level features (node) such as traffic load or antenna tilt, relation-level features (edge) such as handover success rate or mobility thresholds, or even predict the optimal neighbor list a cell should have using link prediction on the adjacency matrix. By injecting the stochastic nature of real-world telecommunications optimization into the learned latent space, the model can capture the inherent uncertainties and variabilities in network behavior. This allows the CVAE to generate robust predictions and solutions that reflect real-world dynamics, offering network operators adaptive, data-driven strategies to optimize performance even under fluctuating conditions.

Figure 12:
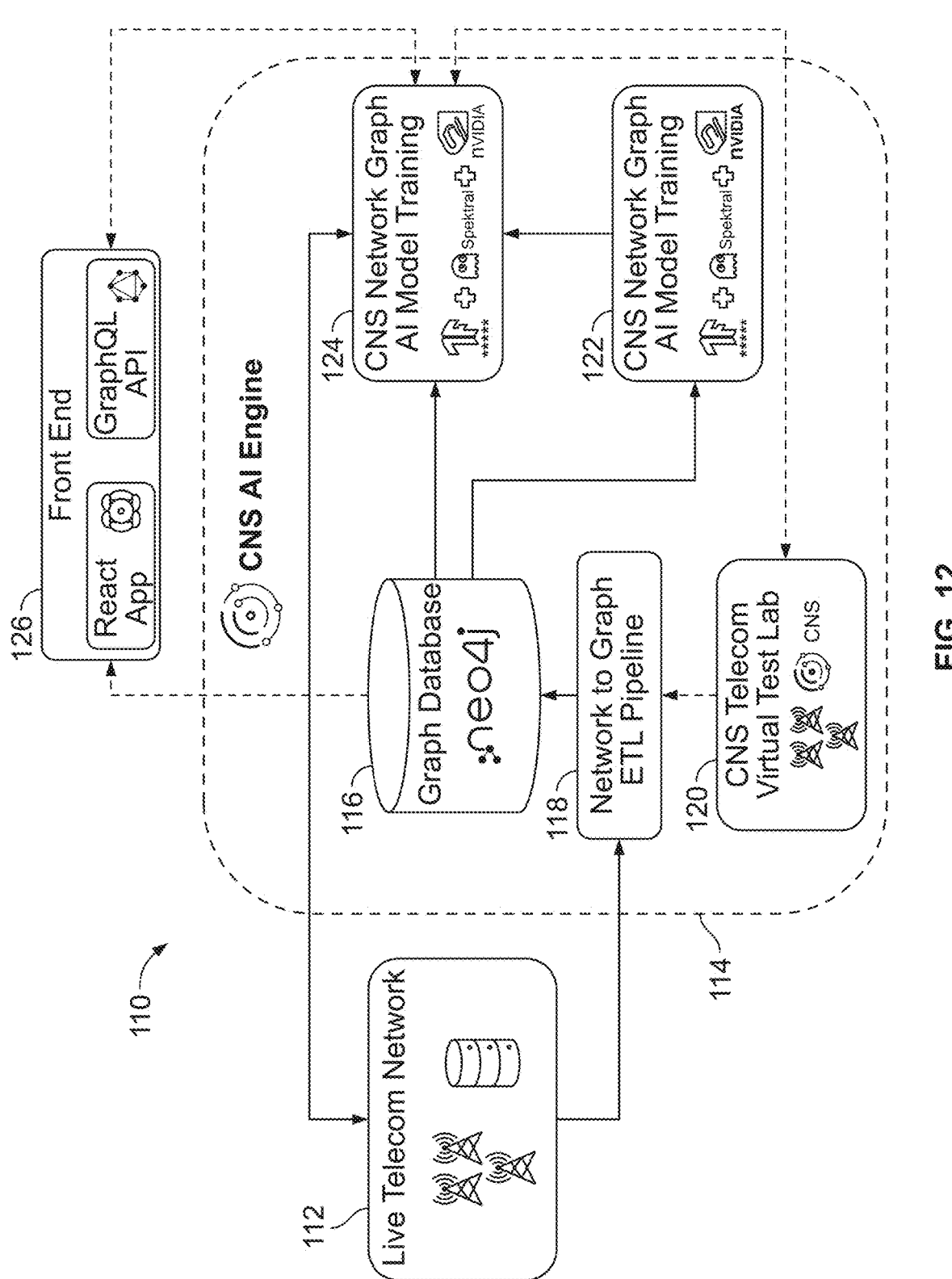
FIG. 12 is a diagram illustrating a cloud-based microservices computing platform in accordance with the systems and methods of the present disclosure.

FIG. 12 is a diagram illustrating a cloud-based microservices computing platform in accordance with the systems and methods of the present disclosure, indicated generally at 110. The platform 110 could include an AI engine 114 (which could correspond to the AI modeling platform 54 of FIG. 4) which monitors a live telecommunications network 112, and a user interface or front-end layer 126 which allows a user to access real-time modeling by the system. The engine 114 could include a graph database 116 which stores graph modeling results, a network to graph extraction-transform-load pipeline 118 which obtains monitoring data from the network 112 and populates the graph database 116, an optional virtual test lab 120 which can additionally provide data to the graph database via the ETL pipeline 118, and one or more network graph AI modeling interfaces 122-124 which are accessible by users via the front end 126. The platform 110 can be implemented as a cloud-native microservices architecture that is built to evolve and scale as needed. This design allows the AI engine to function as an independent service while also allowing seamless integration into other systems or platforms as required. Each individual microservice could be containerized through the Docker platform, ensuring modularity, isolation, and ease of deployment. These containers are designed to be orchestrated as part of a Kubernetes cluster, which provides automated scaling, load balancing, and fault tolerance. This setup allows the platform to dynamically adjust to varying network demands, ensuring high availability and optimal performance even as workloads fluctuate. It is noted that the dashed connections between the front end 126 and the connected components indicate connections that are option or not user-facing modules.

The model training and inference modules 122-124 are the core components within the AI engine 114, responsible for executing the AI models. These two containers are designed to handle distinct but complementary tasks: the training module 122 is where models are developed, tested, and trained, while the inference module 124 is dedicated to serving validated models that are ready for deployment. By separating these two functions into distinct containers, the system ensures that that model development and deployment processes are both isolated and independently scalable. For the implementation of the graph-centric generative models of the present disclosure, the system can use TensorFlow, one of the most popular deep learning frameworks, along with Keras, its high-level API. TensorFlow simplifies the creation of complex models while offering robust tools for efficient training and inference. Keras, in particular, provides an intuitive interface that abstracts much of the complexity, allowing for focus on building and fine-tuning models without dealing with the lower-level details of back-end computations. This streamlined development process enhances the ability to rapidly iterate on model design and optimization.

In addition to TensorFlow and Keras, the system can utilize Spektral, a specialized Python library for graph deep learning, built around the TensorFlow 2 and Keras ecosystem. Spektral provides a flexible framework for designing and customizing GNNs, offering implementations of popular GNN architectures as well as the ability to tweak and create custom models. Its integration with Keras ensures that the system can implement custom graph-based models efficiently, which is beneficial given a focus on graph-centric learning in telecom networks.

A significant advantage of using TensorFlow is its built-in support for GPU acceleration, which plays an important role in both the training and inference processes. By integrating NVIDIA's CUDA toolkit, TensorFlow can leverage the parallel processing capabilities of GPUs, significantly speeding up both the training phase—where large datasets need to be processed—and the inference phase, where rapid predictions are important. Both the training and inference containers are configured to utilize GPU acceleration, ensuring that the platform can scale efficiently and handle heavy data loads. Whether the system is deployed on-premises or in the cloud, it can automatically tap into available GPU resources, improving performance and reducing processing time. Additionally, running the models and associated networks herein on GPU-enabled hardware is beneficial to fully unlock its potential. Leveraging GPU power allows the system to process telecom data at a much faster rate, both for training large models and for real-time inference, ensuring the learning network can adapt and optimize in an efficient, scalable manner.

The graph database 116 plays an important role in storing and managing the network graph model. The database 116 could be implemented using Neo4j, a native graph database, which means it stores data directly as a graph structure, rather than relying on translation during query execution. This native approach provides significant advantages over some other graph databases, particularly those that store data in relational or key-value formats and convert it to a graph only at runtime. By storing data natively as a graph, Neo4j is optimized for graph traversal, querying, and manipulation, allowing the system to efficiently handle the complex, interconnected relationships inherent in telecom network data. This allows for fast, reliable performance to explore, analyze, and extract features from large and complex network structures.

In the system, the database 116 stores the network elements using the network graph schema disclosed herein. This enables the system to maintain the integrity of the graph representation throughout storage and querying processes. The direct graph storage allows the system to preserve and exploit the intricate relationships between network elements without the overhead of translating or reformatting the data each time. One of the benefits of using Neo4j for the database 116 is its ability to facilitate data preprocessing through its powerful Cypher query language. As a declarative language designed specifically for querying graph data, Cypher enables the system to quickly and intuitively perform operations such as:

Data Cleaning and Transformation: Cypher provides a flexible way to clean and transform graph data by filtering out inconsistencies, handling missing values, and normalizing data to prepare it for machine learning tasks.

Subgraph Sampling: Cypher allows for the efficient sampling of smaller network clusters from the overall CNS graph network model, making it easier to focus on specific regions or segments of the telecom network for training and analysis.

Feature Engineering: Cypher enables the easy extraction of graph-based features, such as cell configurations, handover performance, and other cluster level characteristics which all serve as valuable inputs for training the learning network.

Additionally, the system can leverage certain extensions such as APOC (Awesome Procedures on Cypher), a library that extends Neo4j's functionality with a wide range of useful procedures for graph operations. APOC allows the system to perform complex graph manipulations, data integration, and even optimization of Cypher queries, further enhancing the ability to preprocess and analyze the telecom network data effectively.

The ETL pipeline/module 116 is responsible for translating raw telecom network data into the network graph model and storing it in the graph database 116. The flexibility of the ETL module 116 ensures the seamless integration of diverse data sources. The ETL module can be configured to facilitate data transformation using a combination of vanilla cypher queries, APOC libraries, and python scripts. These tools allow for efficient extraction, transformation, and loading of data into the database 116, while leveraging Cypher for direct graph manipulations and APOC for more advanced operations like relational database imports. The ETL module 116 is built to be flexible and scalable, capable of supporting a range of ETL strategies. For instance, enterprise-level ETL strategies could involve integrating with tools like the Neo4j ETL Tool, which automates the process of migrating data from relational databases to Neo4j. Alternatively, for larger-scale, real-time ETL, the module could also support streaming data from Apache Kafka into the graph model of the present disclosure, allowing continuous ingestion and transformation of network data. By designing the ETL module 116 with adaptability in mind, the system ensures that it can meet the demands of various data sources and enterprise-grade systems, making it capable of handling everything from batch processing to real-time data streams.

The front end 126 could be implemented using a GraphQL API to serve data from the Neo4j database 116 to a React application. This front end 126 allows users to visually traverse the network graph through a map and connect to the inference module to execute deployed models. The React framework provides significant advantages for rendering dynamic data. Neo4j integrates well with React through the Apollo Client, a tool designed for managing GraphQL data, making it easier to query the Neo4j graph database and display the results on the front end 126. This setup enables an intuitive, user-friendly interface for visualizing complex network relationships and running model predictions.

The front end 126 allows for open-loop execution of AI models, where model suggestions can be monitored and reviewed by engineers before any changes are applied. It could also facilitate a semi-open-loop approach, where AI-driven optimizations are applied in the background but remain closely supervised by engineers until sufficient trust and validation have been built over time. This approach provides a path for network operators to gradually adopt AI-driven network management, building confidence in the system through repeated validation and monitoring before moving to a fully closed-loop system.

Although not designed as a client-facing microservice, the virtual test lab 120 provides a simulated network environment on the cloud and integrates the AI engine 114 directly into the system. This results in a network simulation fully orchestrated by the system's graph-based AI models. As the simulation evolves, it will allow the AI engine 114 to learn alongside it, progressively increasing the complexity and capability of both systems simultaneously. Developing the AI engine and the simulation together enables the AI models to first master fundamental telecom principles, such as new site deployment and basic traffic management, before advancing to more sophisticated tasks like dynamic coverage optimization and layer management. Through this incremental learning process, the AI engine 114 builds a solid foundation of telecom knowledge, expanding its capabilities step by step until it can autonomously manage and optimize telecom networks from the ground up.

Telecommunications optimization can be broken down into the need to maximize or minimize certain performance metrics. With the system's deep understanding of how telecom networks operate, the system can look past the domain-specific context of these KPIs and transform them into their core mathematical components. Metrics such as averages, counts, and rates are abstracted from their telecom-specific contexts and use them directly to generate realistic labeled data to steer model model. For instance, knowing what a successful outcome of message passing should look like in a telecom graph, the system can create explicit target vectors that represent the desired network state and use those as training labels. This ensures that when the AI encounters similar vectors in real world data, it knows exactly how to respond based on its learned behavior.

While the virtual test lab 120 provides a solid foundation, it is the continuous training on live network data that allows the system's models to fully mature. The lab 120 offers a controlled environment for the models to develop an understanding of core telecom principles, but once deployed, the AI engine 114 is designed to continuously observe and learn from the specific network it manages. This ongoing learning process fine-tunes and expands the general knowledge of the AI engine 114, enabling it to adapt to the unique characteristics and challenges of different network environments. Though the AI engine 114 builds broad knowledge through general learning, it is ultimately designed to specialize within each deployment. Over time, it evolves to meet the unique demands of each client's network, ensuring the AI engine 114 creates a true learning network tailored to the specific requirements of different network operators.

The systems and methods of the present disclosure can be utilized to solve a common network deployment task: Physical Cell Identity (PCI) planning. While PCI planning is generally considered a straightforward problem, the focus here is on the learning process rather than the problem's complexity. By contrasting traditional methods with the AI engine's ability to learn underlying network rules and structure, the engine can not only solve the problem, but do so more efficiently.

The following example showcases how the combination of embedded domain knowledge and the engine's capacity to learn complex network patterns provides a powerful demonstration of the systems and methods of the present disclosure in action. In this example, there is a set range of PCT values allowed for both LTE and 5G networks: LTE has 504 unique PCI values ranging from 0 to 503, and 5G has 1008 unique PCI values ranging from 0 to 1007. For the purposes of this example, the PCI range is limited to 50 unique PCI values ranging from 0-49. This allows exploration of the nature of the problem much quicker computationally while conceptually making the ideal PCI plan harder to generate, which will be explained later in the example.

In cellular networks, a PCI is a unique identifier assigned to each cell, crucial for ensuring that user equipment (UE) can properly identify and connect to the correct cell in a network. A good PCI plan is essential for optimizing network performance, minimizing interference, and avoiding conflicts between neighboring cells. At a high level, the primary role of PCIs is to distinguish each cell in the network, allowing devices to maintain reliable connections and navigate between cells without confusion. However, when PCIs are not properly assigned, two key issues can arise:

1. PCI Conflict: A PCI conflict occurs when two neighboring cells are assigned the same PCI. In this situation, the UE may struggle to differentiate between the cells, leading to connection issues.
2. PCI Confusion: A PCI confusion happens when a cell has two or more neighbors with the same PCI, even if those neighbors are not direct neighbors themselves. In practice, this means that a cell could receive signals from multiple neighbors using the same PCI, causing confusion in the network that leads to mobility issues.

FIG. 13A is diagram illustrating planning of a cell's physical cell identity (PCI) with and without conflict, and FIG. 13B is a diagram illustrating planning of a cell's PCI with and without confusion. These figures depict examples of cells planned both with and without PCI conflict and confusion, respectively. An optimal PCI plan eliminates instances of these issues across the network, which ensures seamless mobility and removal of cell identification issues during the handover process.

Figures 14, 15:
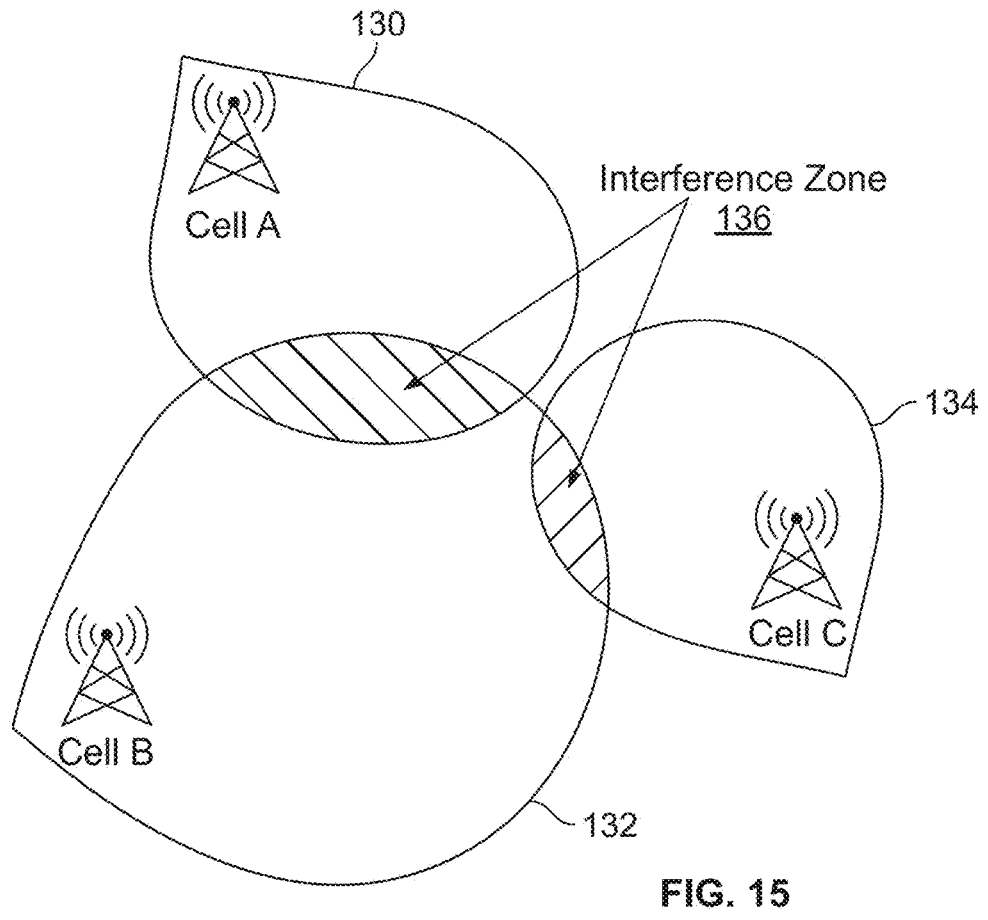
FIG. 14 is a table illustrating a sample interference matrix used to calculate a PCI plan for an area.
FIG. 15 is a diagram illustrating interference zones calculated by evaluating overlapping coverage areas between cells.

FIG. 14 is a table illustrating a sample interference matrix used to calculate a PCI plan for an area. Traditional PCI planning requires a lengthy process of data collection and the application of computationally intensive algorithms. While the concept is straightforward, the actual process can easily take a full day or more, depending on the size of the cellular network, and involve generating the interference matrix shown in FIG. 14. In this example, the row labels represent the best serving cells in this area, while the columns labeled "Interferer" list neighboring cells that may be causing some interference to the best servers. Each interferer is assigned weight indicating the degree of interference it contributes to a specific cell. The total interference for each cell is calculated by summing the values from all its neighboring interferers. This calculation is done for every cell in the network, and the total sum of the matrix is used to determine the quality of the frequency plan.

FIG. 15 is a diagram illustrating interference zones calculated by evaluating overlapping coverage areas between cells. As can be seen, the coverage areas 130, 132, and 134 (corresponding to cells A-C, respectively) create interference zones 136, which are calculated by evaluating the overlapping coverage areas between the cells. To generate an effective frequency plan, traditional automation algorithms typically involve repeating three key steps:

1. An interference matrix is created based on signal strength and distance.
2. The algorithm incorporates additional performance data, such as handover metrics between neighboring cells.
3. Additional optimization techniques are applied, such as greedy algorithms or simulated annealing, to assign PCIs to cells while minimizing overall interference.

Before the algorithm can reach an optimal solution, it requires thousands of iterations, making the process at runtime both time-consuming and computationally demanding. Each iteration performs the same calculation without retaining information from previous runs, requiring the entire process to be repeated from scratch every loop. By utilizing graph-based generative neural networks, the system can train a model to understand the graph-like nature of cellular infrastructure, capturing the underlying rules of an ideal PCI plan within a probabilistic latent space. This enables the generative component of the model to initiate PCI plan generation close to the optimal state. As a result, the runtime is significantly reduced, with the trained neural network completing the task in seconds, compared to the hours or days required by traditional methods.

To explore this problem effectively, an instance of the AI engine disclosed herein was implemented on a local server integrated with a single GPU. The virtual test lab was used to generate a small test network, with realistic site deployments based on a historical cell site map of the Dallas-Fort Worth area. 24 cell sites were generated, each with three cells each (72 cells total). The neighbor relations between cells were based on relative distance between other cells in the same geographical area. The core of cell neighbors relations is based on physical proximity. Each of the cell ended up with a neighbor list consisting of between 20-41 neighbors.

The simulation was given the capability of generating a realistic (not ideal) PCI value for each cell based on common PCI reuse practices. In a network deployment, there always exists an ideal number of times one should be reusing PCIs globally based on the result of the equation $N_{cells} \div N_{PCI}$. The simulation can shuffle this plan around at random, allowing for training on multiple different PCI deployment configurations. As stated earlier, we limiting the range of PCIs to be between 0-49 for the purposes of this example.

In modern telecom networks, Automated Neighbor Relations (ANR) algorithms are used to automatically manage the addition and removal of neighbors from a cell's configured neighbor list based on its current coverage area. A cell will be added to another cell's neighbor list if it is "seen" by the other cell and there have been handover attempts between them. The only way for this to occur in a wireless network is for there to be some physical overlap between the coverage areas of both cells. These ANR algorithms are continuously running, keeping the neighbor lists of all cells updated in near real time.

The network graph model of the present disclosure constructs its graph edges based on the explicit neighbor relationships between cells, which are directly extracted from the telecom network by retrieving each cell's neighbor list from the network configuration data. This means that each cell node within the resulting graph has overlapping coverage with the cells it has an edge with. The information gets inherently captured within graph's adjacency structure, even without defining a single edge feature. This fact completely eliminates the need to perform any type of interference matrix, distance, or signal strength calculation. Since the system knows which cells overlap (which cells have edges connecting each other), it can train models to traverse the network graph and understand why certain cells adhere to or violate the established PCI planning practices shown in FIGS. 13A-13B.

Next, two deterministic GNN models were constructed to learn how to identify cells that conform to or violate the PCI planning rules. These models serve two purposes: they generate node-level and graph-level classification labels to be used as conditional variables for the final CVAE model, and they act as a validation and correction mechanism for generated plans. While the CVAE generative model can produce a PCI plan close to optimal, these two models can adjust the plan if needed to ensure it fully adheres to the PCI planning rules.

The first trained model is one that can identify all the cells that are experiencing PCI confusion within the network. This information is beneficial for evaluating the quality of generated PCI plans, as any ideal plan will have no cells experiencing this issue. It is noted that there is no requirement to train a model to identify PCI conflict, as this is just an extreme case of PCI confusion. The scenario where a PCI conflict exists in a network without a PCI confusion can be ignored.

Figures 16, 17, 18:
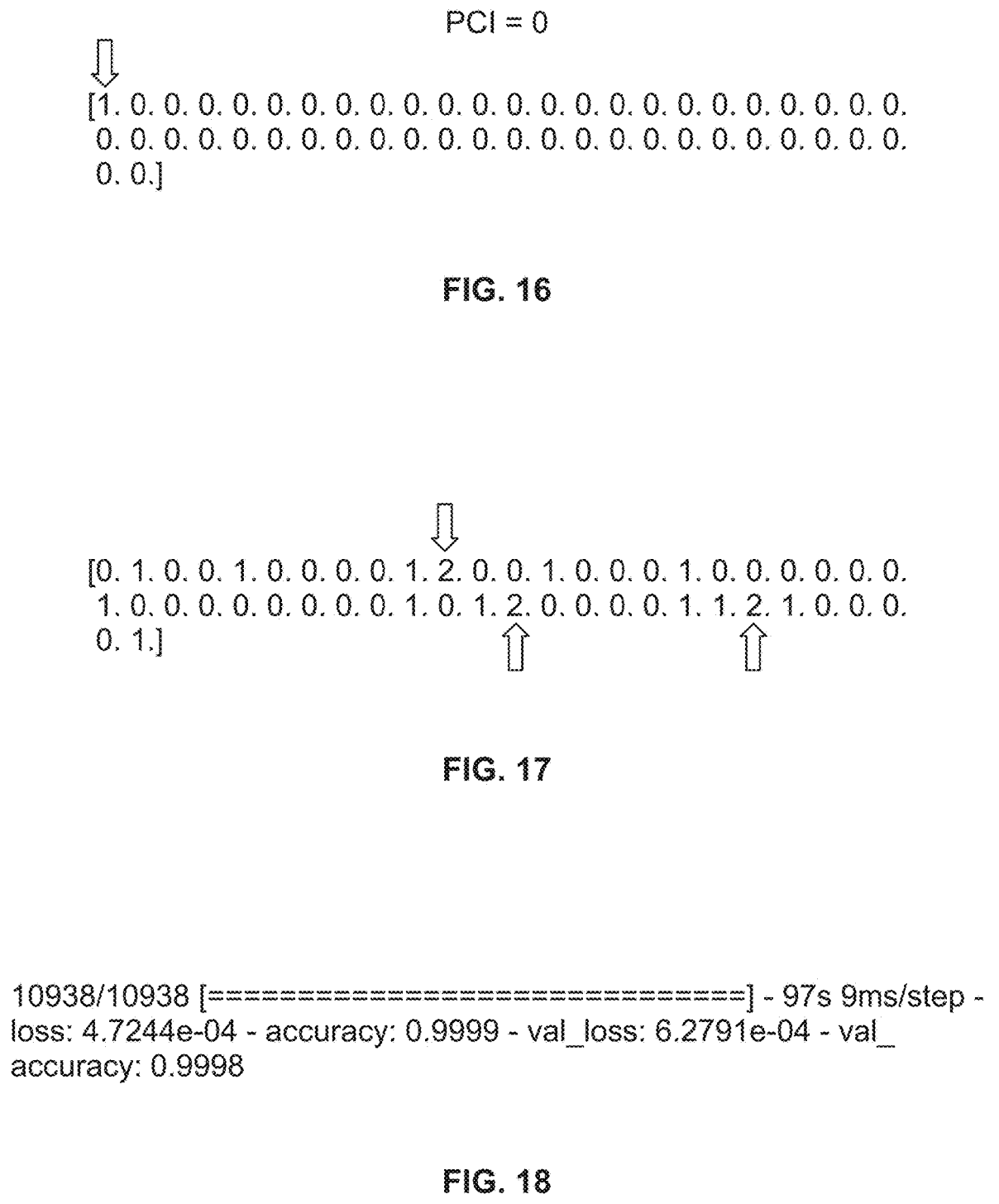

FIG. 16 is a diagram illustrating a PCI value of 0 represented as a one-hot vector of length 50. To initiate modeling, the system first treats the PCI feature as a categorical label rather than a real number. This distinction allows the system to apply a one-hot encoding approach to the PCI feature. One-hot encoding transforms the PCI data into binary vectors where each category is represented with a 1 in the position (index) corresponding to that category and 0s in all other positions. These vectors all have a length that corresponds to the number of categories the feature has, 50 in this case. Treating the PCI values this way allows us to frame the problem as counting instances a specific PCI is present in aggregations of PCI feature vectors.

FIG. 17 is a diagram illustrating an aggregated PCI vector with multiple instances of repeated values, indicating confusion. Since confusion happens when a source cell has two or more neighbors with the same PCI value, a single explicit message passing layer of a MPNN using sum aggregation can acquire all information necessary to identify this issue in a cell. If the resulting vector, post message passing, contains a value of 2 or more at any index (indicated by the arrows in FIG. 17), it indicates that multiple instances of that PCI are present in the cell's neighborhood, signaling confusion.

Leveraging the fact that feature vectors need to be summed during message passing, and knowing what to look in the resulting vector post aggregation, no learnable weights were added in the message passing layer of the MPNN. Instead, the system utilized a trained Binary Classification model using a MLP architecture, and combined an explicit message passing layer with a trained classifier into one complete GNN model. The reason for this is that the system can independently train the classifier to directly classify the two different types of aggregated vectors to be identified. By knowing what the vectors should or shouldn't look like post message passing, the system is able to simulate millions of instances of both "good" and "bad" vectors for training, assigning classification labels to each one for a highly effective supervised learning approach.

Table 1, below, provides detailed information relating to the binary vector classifier implemented by the systems and methods of the present disclosure.

TABLE 1

| Model Summary | |
|---|---|
| Model Name | Binary Vector Classifier |
| Model Description | This binary classification model is designed to learn the PCI confusion rule of a network graph independently of the message passing process. It identifies violations where an aggregated feature vector has two or more instances of the same PCI, using large amounts of valid training data to improve accuracy. This approach bypasses the need for explicit message-passing during training while still ensuring precise PCI confusion identification. |
| ML Libraries Used | TensorFlow |
| Model Architecture Type | Multi-Layer Perceptron (MLP) |
| Model Inputs | Single/Batched aggregated one-hot PCI feature vectors of shape (F,) |
| Model Output | A Boolean classification label per vector flagging category reuse |
| Model Layers | |
| Dense Layer 1 | 128 neurons |
| | Batch normalization |
| | ReLU activation function |
| Dense Layer 2 | 64 neurons |
| | Batch normalization |
| | ReLU activation function |
| Dense Layer 3 | 32 neurons |
| | Batch normalization |
| | ReLU activation function |
| Dense Output Layer | 1 neuron |
| | Sigmoid activation function |
| Dataset | |
| Data Source | Aggregated one-hot PCI feature vectors (Simulated) |
| Data Preprocessing | Summed between 10-50 randomized PCI features per vector, simulating how a vector looks post message passing. |
| | 50% of the data was generated with no PCI feature repeated in the sum, labeled with a Boolean value of False indicating no confusion. |
| | 50% of the data was generated with a PCI feature repeated in the sum at least once, labeled with a Boolean value of True indicating confusion. |
| | Each vector gets passed through an exponential function $X^3$, adding significant additional weight to any index containing a value greater than one. |
| Dataset Size | Training data: 1,400,000 generated vectors |
| | Validation data: 600,000 generated vectors |
| Training Details | |
| Loss Function | Binary Cross-Entropy |
| Optimizer | Adam |
| Learning Rate | TensorFlow's default learning rate |
| Batch Size | 128 |
| # of Epochs | 1 |
| Training Results | |
| Training Dataset Results | Loss: $4.7244e^{-4}$ |
| | Accuracy: 99.99% |
| Validation Dataset Results | Loss: $6.2791e^{-4}$ |
| | Accuracy: 99.98% |
| Conclusion | |

The model was successful in learning how to distinguish the two different types of aggregated feature vectors, achieving an accuracy score of 99.98% on the validation dataset. This model is ready to be attached to an explicit message passing layer as part of a MPNN and used to classify PCI confusions on a network graph.

FIG. 18 illustrates training results of a binary vector classifier model described above in connection with Table 1.

Table 2, below, provides detailed information relating to the MPNN PCI confusion classifier model implemented by the systems and methods of the present disclosure.

TABLE 2

| Model Summary | |
|---|---|
| Model Name | MPNN PCI Confusion Classifier |
| Model Description | This MPNN model is designed to detect cells experiencing PCI confusion within a network graph. The message passing part of the model does not have trainable weights, but explicitly |

TABLE 2-continued

| | |
|---|---|
| | sums the PCI feature vector from all neighbor nodes. The pretrained Binary Vector Classifier is then attached which gives this model its ability to classify PCI confusion per cell. |
| ML Libraries Used | TensorFlow |
| | Spektral |
| Model Architecture Type | Message Passing Neural Network (MPNN) |
| | Multi-Layer Perceptron (MLP) |
| Model Inputs | Single/Batched node feature matrix with N nodes each containing a single PCI value pre categorical encoding |
| | Graph adjacency matrix as a sparse matrix of shape (N, N) |
| Model Output | A Boolean classification label per cell indicating the presence of a PCI confusion |
| | Model Layers |
| Category Encoding Layer | 50 categories |
| | One-hot encoded output |
| Message Passing Layer (Spektral) | Message function: target to source |
| | Aggregation function: Sum |
| | Update function: $X^3$ activation function |
| | No learnable weights in any of the MAU steps |
| | No self-loops |
| Pretrained Classifier Layer | Binary Vector Classifier Model (pretrained) |
| | Dataset |
| Data Source | The simulated network deployment described above. |
| Data Preprocessing | N/A |
| Dataset Size | Node feature matrix of shape (72, 1): One PCI feature per node |
| | Sparse adjacency matrix of shape (72, 72) |
| | Training Details |
| Loss Function | Model weights are already trained |
| Optimizer | Model weights are already trained |
| Learning Rate | Model weights are already trained |
| Batch Size | Model weights are already trained |
| # of Epochs | Model weights are already trained |
| | Training Results |
| Training Dataset Results | Model weights are already trained |
| Validation Dataset Results | Model weights are already trained |
| | Conclusion |
| | After merging the explicit message passing layer and the pretrained Binary Vector Classifier into one combined MPNN classification model, the system can operate on a network graph and classify if each node is experiencing a PCI confusion or not. It correctly classifies when PCI confusions experienced by nodes 99.98% of the time (accuracy of the Binary Vector Classifier). |

The resulting MPNN PCI Confusion classifier is fully capable of operating on network graphs of varying sizes to classify PCI confusions at the cell level. However, while this MPNN model performs well for node-level classification, its message passing operation explicitly aggregates feature vectors without learning anything about the underlying network structure. Therefore, this MPNN serves as an intermediate step to generate accurate graph node labels for training an implicit GAT model that can achieve the same results while learning through the network's topology.

MPNNs require computing full feature vectors for every node, which becomes computationally intensive as the network scales. One-hot encoding the PCI features adds further complexity, especially in large graphs, as this encoding method creates high-dimensional sparse vectors. The drawback of one-hot encoding is that it scales poorly with large categorical feature sets, leading to increased memory consumption and computational overhead. To address these challenges, the GAT model aims to learn the network structure by using trainable GNN layers instead of an explicit message passing framework, and increase scalability through dimensionality reduction and implicit attention-based learning.

Table 3, below, provides detailed information about the GAT PCI confusion classifier model implemented by the systems and methods of the present disclosure:

TABLE 3

| | |
|---|---|
| | Model Summary |
| Model Name | GAT PCI Confusion Classifier |
| Model Description | This GAT PCI Confusion Classifier model is designed to detect cells experiencing PCI confusion within a network graph. By using the explicit MPNN version of this model to generate accurate training labels, the system is able to both learn through the network structure and reduce the dimensionality of the model. |

TABLE 3-continued

| ML Libraries Used | TensorFlow |
| --- | --- |
| | Spektral |
| Model Architecture Type | Graph Attention Network (GAT) |
| | Multi-Layer Perceptron (MLP) |
| Model Inputs | Single/Batched node feature matrix with N nodes |
| | each containing a single PCI value pre categorical |
| | encoding |
| | Graph adjacency matrix of shape (N, N) |
| Model Output | A Boolean classification label per cell indicating the presence |
| | of a PCI confusion |
| | Model Layers |

| Embedding Layer | 50 categories |
| --- | --- |
| | Embedding dimension: 16 |
| Reshape Layer | Flattening extra dimension created by embedding layer to |
| | match original node feature matrix shape of (N, F) |
| GAT Layer (Spektral) | Channels: 32 |
| | Attention heads: 8 |
| | Concatenate attention heads |
| | ReLU activation function |
| | No self-loops |
| Dense Layer 1 | 64 neurons |
| | Batch normalization |
| | ReLU activation function |
| Dense Layer 2 | 32 neurons |
| | Batch normalization |
| | ReLU activation function |
| Dense Layer 3 | 16 neurons |
| | Batch normalization |
| | ReLU activation function |
| Dense Output Layer | 1 neuron |
| | Sigmoid activation function |
| | Dataset |

| Data Source | The simulated network deployment described above. |
| --- | --- |
| Data Preprocessing | We simulated 120,000 different variations of PCI |
| | plans by shuffling (not randomizing) the PCI |
| | assignments for all nodes. |
| | Each PCI plan has the same adjacency matrix. Ideally, |
| | we want to avoid changing the neighbor list for cells |
| | when planning PCI if possible (this isn't a link |
| | prediction model). |
| Dataset Size | Training Data: 100,000 shuffled PCI plans |
| | Validation Data: 20,000 shuffled PCI plans |
| | Training Details |

| Loss Function | Binary Cross-Entropy |
| --- | --- |
| Optimizer | Adam |
| Learning Rate | TensorFlow's default learning rate |
| Batch Size | 64 |
| # of Epochs | 50 |
| | Training Results |

| Training Dataset Results | Loss: 0.0116 |
| --- | --- |
| | Accuracy: 99.61% |
| Validation Dataset Results | Loss: 0.016 |
| | Accuracy: 99.49% |
| | Conclusion |

The GAT-based PCI confusion classifier successfully replicated the performance of its MPNN counterpart while significantly reducing model dimensionality. By replacing one-hot encoded vectors with an embedding layer, it achieved a more streamlined representation of the input data. Additionally, the number of neurons in the classifier layer was halved, further optimizing computational resources. This resulted in faster inference times without compromising accuracy. The model achieved a validation accuracy of 99.49%, only a 0.49% drop off in accuracy from the MPNN version.

FIG. 19 illustrates training results of the GAT PCI confusion classifier model discussed above in connection with Table 3.

FIG. 20 is a diagram illustrating a PCI confusion reward function. Once the PCI confusion model was properly trained, the system leveraged its output to evaluate PCI plans at the graph level. By aggregating the node classifications, a method was developed to assess the overall quality of any given PCI plan. Specifically, the model's output was utilized to create a graph-level score through a PCI reward function, which averages the number of confusions across the entire network graph. This reward function provides a clear metric: poor plans, with many confusions, score near 0, while optimal plans, with minimal or no confusions, approach a perfect score of 1. The confusion model and reward function were used to generate additional conditional variables for the final CVAE to learn from, allowing it to learn about different PCI plans on both node-level and graph-level.

While identifying the cells experiencing PCI confusion is essential for evaluating the quality of a PCI plan, it is important to find the cells whose PCI assignments are causing that confusion. To effectively correct a plan, it is necessary to target these problematic PCI assignments and adjust them so that they no longer disrupt the network. Although the impact of poor PCI assignments is always felt by the confused cells, the root of the problem lies in the cells with incorrect PCI assignments. As a result, the system constructs an MPNN model that identifies cells causing PCI confusion, and retunes the PCI of those cells to validate alternative values.

PCI confusion occurs when two or more neighboring cells of a given cell have the same PCI, even if those neighbors may not be neighbors themselves. Therefore, no cell in the network should have the same PCI as any other cell within two tiers of itself. To gather all the relevant to identify and address this issue, two layers of message passing are necessary. In the first layer, the system treats the PCI feature as a one-hot encoded categorical variable, and analyzes it from the perspective of the cell potentially causing a confusion. When message passing is performed for the first time, a cell aggregates the PCI values from its immediate neighbors into its own feature vector. However, this means that the same cell is also sending out its own PCI information to all of its first tier neighbors. So, by proxy, the cell's neighbors are gathering the original cell's PCI value into their own respective feature vectors.

In the second layer, the cell ends up not only aggregating information from its first-tier neighbors, but also from its neighbors' neighbors due to the first message passing step. This gives the original cell visibility into the PCI values present in the second-tier of the network. Since the original cell's PCI value was broadcasted to all first-tier neighbors during the first pass, this cell will now receive back its own PCI as part of the second-tier information. This second pass allows the system to identify whether that cell's PCI is present anywhere else within two tiers of itself.

If the original cell receives a feature vector in which its PCI appears the exact number of times as it has first-tier neighbors, it means that PCI value exists nowhere else within in its two-tier neighborhood. However, if its PCI value appears more frequently than the number of its first-tier neighbors, it indicates another cell within the two-tier range has the same PCI as the original cell. Cells where these type of vectors are identified will be the ones causing PCI confusion in the network.

FIG. 21 is an illustration operation of two cells each with 35 neighbors. As shown, cell A causes confusion, but cell B does not cause any confusion. Cell A is responsible for causing one or more PCI confusions, as its feature appears more than 35 times after two layers of message passing. In contrast, cell B does not cause any confusion as the PCI information originally sent by the cell during the first message pass is the only information present for this PCI in the final vector.

After getting this resulting PCI vector for every cell, the system further processes the vector to extract only the relevant information. The system leverages two key pieces of information to accomplish this: the degree matrix (which is a diagonal matrix used in graph theory, where each diagonal element represents the degree (e.g., the number of edges) of the corresponding node in a graph), and the original one-hot representations of the PCI features. By using the original adjacency matrix, the degree matrix is calculated, which gives us the number of neighbors each node in the graph has. Next, the system applies the one-hot representation of each cell's PCI feature as a mask. This is done by multiplying the one-hot vector with the corresponding output, exploiting the fact that the one-hot vector can act as an identity vector for the PCI feature. This operation zeros out all other features except the one that is of interest, ensuring only the relevant PCI information is passed through.

Once the masked result has been generated, it is divided by the degree matrix, producing an intermediate result. For cells that are not causing any confusion, the outcome is identical to the original one-hot representation (since the count of PCI occurrences will equal the number of neighbors, resulting in a ratio of 1 for that position and 0 for all others). For cells causing confusion, the vector will have a value greater than 1 in the position corresponding to the conflicting PCI, while all other positions remain 0.

The system applies a shifted ReLU activation function as a final step to further refine this output. Normally, ReLU converts all negative values to 0 and passes through positive values. However, in the present system, the threshold is shifted so that any value less than or equal to 1 is mapped to 0, while any value greater than 1 is passed through. This ensures that cells not causing confusion return a sparse vector of all zeros, while cells causing confusion will have a single value greater than 1 at the conflicting PCI position. Finally, additional weight is added to any non-zero element. This additional weightage makes it easier for a classifier model to identify the difference between the two types of vectors.

FIG. 22 is a diagram illustrating the same example as FIG. 21, with further refinement logic applied in accordance with the systems and methods of the present disclosure. More specifically, the system adds a weight factor to any non-zero appearing in resulting vector. The additional weightage makes it much easier for a classifier to learn the difference between the two types of vectors. First, the system generated the types of vectors to directly classify and trained a binary classification model. Second, an explicit MPNN is generated with two message passing layers that requires no trainable weights. This network includes a layer to compute the degree matrix, followed by layers that perform the necessary mathematical transformations: multiplying by the one-hot encoded PCI vector, dividing by the degree matrix, and applying a shifted ReLU activation function. The trained classifier is then attached as the last layer of this model. Finally, an implicit GAT model is trained to replicate the results achieved by the explicit MPNN. The GAT model is designed to classify PCI confusion contributors by learning directly from the underlying network structure. To create the training data, the system generated multiple shuffled PCI plans and labeled them by processing them through the MPNN, which provided ground truth classifications.

Table 4, below, provides detailed information regarding the PCI issue vector classifier generated by the systems and methods of the present disclosure.

TABLE 4

| Model Summary | |
| --- | --- |
| Model Name | PCI Issue Vector Classifier |
| Model Description | This binary classification model is designed to learn the PCI issue |

TABLE 4-continued

|  |  |
|---|---|
|  | contributor rule of a network graph independently of the message passing process. It identifies violations where a processed feature vector has a single non-zero value present, using large amounts of valid training data to improve accuracy. This approach bypasses the need for explicit message-passing during training while still ensuring precise PCI issue contributor identification. |
| ML Libraries Used | TensorFlow |
| Model Architecture Type | Multi-Layer Perceptron (MLP) |
| Model Inputs | Single/Batched one-hot PCI feature vectors post message passing and vector refinement of shape (F, ) |
| Model Output | A Boolean classification label per vector flagging category presence |
| | Model Layers |
| Dense Layer 1 | 128 neurons<br>Batch normalization<br>ReLU activation function |
| Dense Layer 2 | 64 neurons<br>Batch normalization<br>ReLU activation function |
| Dense Layer 3 | 32 neurons<br>Batch normalization<br>ReLU activation function |
| Dense Output Layer | 1 neuron<br>Sigmoid activation function |
| | Dataset |
| Data Source | Aggregated one-hot PCI feature vectors post message passing and additional processing (Simulated) |
| Data Preprocessing | 50% of the data was generated as sparse vectors with all zero values, labeled with a Boolean value of False indicating no confusion caused by this cell.<br>50% of the data was generated with a single non-zero value at one of the positions, labeled with a Boolean value of True indicating that cell is causing a confusion somewhere in the network.<br>For the vectors with non-zero values, we randomized that value in that random position to be any real number within the range 5 to 80. This simulates both the weight that will get applied to the vector as well as the severity of the issue caused by this cell. |
| Dataset Size | Training data: 1,400,000 generated vectors<br>Validation data: 600,000 generated vectors |
| | Training Details |
| Loss Function | Binary Cross-Entropy |
| Optimizer | Adam |
| Learning Rate | TensorFlow's default learning rate |
| Batch Size | 128 |
| # of Epochs | 1 |
| | Training Results |
| Training Dataset Results | Loss: $9.1662e^{-8}$<br>Accuracy: 100% |
| Validation Dataset Results | Loss: $1.0339e^{-9}$<br>Accuracy: 100% |
| | Conclusion |

The model was successful in learning how to distinguish the two different types of feature vectors, achieving an accuracy score of 100% on both the training and validation datasets. This model is ready to be attached as part of a MPNN and used to classify PCI cells causing PCI confusions on a CNS network graph.

FIG. 23 is a diagram illustrating training results of the PCI issue vector classifier model discussed above in connection with Table 4.

Table 5, below, provides detailed information regarding the MPNN PCI issue classifier model generated by the systems and methods of the present disclosure.

TABLE 5

|  |  |
|---|---|
| | Model Summary |
| Model Name | MPNN PCI Issue Classifier |
| Model Description | This MPNN model is designed to detect cells causing PCI confusion within a network graph. The two message passing layers of model do not have trainable weights, but explicitly sum the PCI feature vector from all neighbor nodes. The pretrained PCI Issue Vector Classifier is then |

TABLE 5-continued

|  |  |
|---|---|
|  | attached which gives this model its ability to classify PCI issue contributors per cell. |
| ML Libraries Used | TensorFlow |
|  | Spektral |
| Model Architecture Type | Message Passing Neural Network (MPNN) |
|  | Multi-Layer Perceptron (MLP) |
| Model Inputs | Single/Batched node feature matrix with N nodes each containing a single PCI value pre categorical encoding |
|  | Graph adjacency matrix as a sparse matrix of shape (N, N) |
|  | Graph adjacency matrix as a dense matrix of shape (N, N). This is for the degree matrix calculation |
| Model Output | A Boolean classification label per cell indicating the cell's PCI assignment is causing a confusion in the network |
|  | Model Layers |
| Category Encoding Layer | 50 categories |
|  | One-hot encoded output |
| Message Passing Layer 1 (Spektral) | Message function: target to source |
|  | Aggregation function: Sum |
|  | Update function: Default |
|  | No learnable weights in any of the MAU steps |
|  | No self-loops |
| Message Passing Layer 2 (Spektral) | Message function: target to source |
|  | Aggregation function: Sum |
|  | Update function: Default |
|  | No learnable weights in any of the MAU steps |
|  | No self-loops |
| Masking Layer | Multiply original node feature matrix by the feature matrix post two message passing layers |
| Degree Matrix Division Layer | Divide masked features by degree matrix |
| Shifted ReLU layer | Shift ReLU by 1 to transition at 1 rather than 0. |
|  | Add amplification factor to add larger weight to any non-zero value getting passed through |
| Pretrained Classifier Layer | PCI Issue Vector Classifier Model (pretrained) |
|  | Dataset |
| Data Source | The simulated network deployment described above. |
| Data Preprocessing | N/A |
| Dataset Size | Node feature matrix of shape (72, 1): |
|  | One PCI feature per node |
|  | Sparse adjacency matrix of shape (72, 72) |
|  | Training Details |
| Loss Function | Model weights are already trained |
| Optimizer | Model weights are already trained |
| Learning Rate | Model weights are already trained |
| Batch Size | Model weights are already trained |
| # of Epochs | Model weights are already trained |
|  | Training Results |
| Training Dataset Results | Model weights are already trained |
| Validation Dataset Results | Model weights are already trained |
|  | Conclusion |

After merging two explicit message passing layers, the additional feature processing layers, and the pretrained PCI Issue Vector Classifier into one combined MPNN classification model, the system can operate on a network graph and classify if each cell is causing a PCI confusion or not. It correctly classifies these issues 100% of the time (accuracy of the PCI Issue Vector Classifier).

Table 6, below, provides detailed information relating to the GAT PCI Issue classifier model generated by the systems and methods of the present disclosure.

TABLE 6

|  |  |
|---|---|
|  | Model Summary |
| Model Name | GAT PCI Issue Classifier |
| Model Description | This GAT PCI Confusion Classifier model is designed to detect cells causing PCI confusion within a network graph. By using the explicit MPNN version of this model to generate accurate training labels, the system is able to both learn through the network structure and reduce the dimensionality of the model |

TABLE 6-continued

| | |
|---|---|
| ML Libraries Used | TensorFlow |
| | Spektral |
| Model Architecture Type | Graph Attention Network (GAT) |
| | Multi-Layer Perceptron (MLP) |
| Model Inputs | Single/Batched node feature matrix with N nodes |
| | each containing a single PCI value pre categorical |
| | encoding |
| | Graph adjacency matrix of shape (N, N) |
| Model Output | A Boolean classification label per cell indicating the cell's PCI |
| | assignment is causing a confusion in the network |
| | Model Layers |
| Embedding Layer | 50 categories |
| | Embedding dimension: 16 |
| Reshape Layer | Flattening extra dimension created by embedding layer to |
| | match original node feature matrix shape of (N, F) |
| GAT Layer 1 (Spektral) | Channels: 32 |
| | Attention heads: 8 |
| | Concatenate attention heads |
| | ReLU activation function |
| | No self-loops |
| GAT Layer 2 (Spektral) | Channels: 32 |
| | Attention heads: 8 |
| | Concatenate attention heads |
| | ReLU activation function |
| | No self-loops |
| Dense Layer 1 | 64 neurons |
| | Batch normalization |
| | ReLU activation function |
| Dense Layer 2 | 32 neurons |
| | Batch normalization |
| | ReLU activation function |
| Dense Layer 3 | 16 neurons |
| | Batch normalization |
| | ReLU activation function |
| Dense Output Layer | 1 neuron |
| | Sigmoid activation function |
| | Dataset |
| Data Source | The simulated network deployment described above. |
| Data Preprocessing | We simulated 120,000 different variations of PCI |
| | plans by shuffling (not randomizing) the PCI |
| | assignments for all nodes. |
| | Each PCI plan has the same adjacency matrix. Ideally, |
| | we want to avoid changing the neighbor list for cells |
| | when planning PCI if possible (this isn't a link |
| | prediction model) |
| Dataset Size | Training Data: 100,000 shuffled PCI plans |
| | Validation Data: 20,000 shuffled PCI plans |
| | Training Details |
| Loss Function | Binary Cross-Entropy |
| Optimizer | Adam |
| Learning Rate | TensorFlow's default learning rate |
| Batch Size | 64 |
| # of Epochs | 35 |
| | Training Results |
| Training Dataset Results | Loss: 0.0075 |
| | Accuracy: 99.84% |
| Valit ataset Results | Loss: 0.0109 |
| | Accuracy: 99.73% |
| | Conclusion |

The GAT-based PCI confusion classifier successfully replicated the performance of its MPNN counterpart while reducing model dimensionality. By replacing one-hot encoded vectors with an embedding layer, it achieved a more streamlined representation of the input data. The number of neurons in the classifier layer was halved, further optimizing computational resources. The system also eliminated the need for extra explicit computations regarding the degree matrix. This resulted in faster inference times without compromising accuracy. The model achieved a validation accuracy of 99.73%, a 0.27% drop off in accuracy from the MPNN version.

FIG. 24 is a diagram illustrating training results of the GAT PCI issue classifier model discussed above in connection with Table 6. The resulting model is used to generate one more piece of conditional information for the final CVAE to learn from. The model can now learn more about why those confusions occur and which PCI assignments are responsible. This additional layer of understanding ensures the model can not only assess the quality of a PCI plan but also guide corrective actions to improve poor configurations.

FIG. 25 is a diagram illustrating a resulting PCI feature vector after two layers of message passing in a network graph in accordance with the systems and methods of the present disclosure. This cell has 6 available PCI values that are valid retune candidates, indicated by the fact that these values are not present anywhere in the two-tier neighborhood.

As discussed above in connection with FIG. 21, after performing two layers of explicit message passing, the system can aggregate feature vectors that provide crucial information about the PCI values present in the local 2-tier neighborhood. More importantly, the system can also gain insight into which PCI values are absent, indicated by indices where the value is "0" in the resulting PCI vector. These "0" values reveal which PCI values have not been seen during the message-passing process and are therefore safe to use for retuning. This can be utilized to construct an agent that can retune the PCI of the cells causing PCI confusion in a network.

The agent's task is to use the trained GNN models to identify the quality of the PCI plan and determine which specific cells are causing PCI confusion. Once the problematic cells are identified, the agent proceeds with retuning those cells by selecting absent PCI values, ensuring the conflicts are resolved. This retuning process is iterative: the agent continuously uses these GNN models to assess the PCI plan, identify further retuning opportunities, and validate corrections. The process repeats until all confusion issues are resolved and the PCI plan is fully optimized.

The actual retuning relies on the generative capabilities of the final CVAE model, which is designed to generate PCI plans that are close to optimal. The retuning agent acts as a supplementary step to fine-tune the generated plans when necessary. The closer the generated PCI plan from CVAE gets to the ideal state, the less the retune agent needs to work to perfect it.

In addition to fine-tuning all generated PCI plans, this retuning agent can be used to enhance the generative CVAE model itself. While the CVAE model may not always produce an ideal PCI plan initially, even when using conditional variables, the agent corrects and perfects the plan when possible. This corrected plan can now be used as new training data to improve the generative model's future outputs. By incorporating these corrected plans into the training process, the model progressively learns to generate more optimal plans over time, reducing reliance on the retuning agent over time.

After training the previous two GAT models for identifying both the cells experiencing and causing PCI confusion in the network, the system constructed the PCI plan generator using our proposed CVAE architecture. This model takes in three main inputs: the graph node feature matrix (including the PCI feature per node), the adjacency matrix representing the graph's structure, and the conditional variables. The conditional variables are generated using the previously trained GAT models and include the PCI confusion flag, PCI issue contributor flag, and a graph-level quality score.

The challenge in constructing an effective CVAE model for PCI planning is ensuring that the generated PCI features respect the global properties of the graph structure. The model must capture not just local relationships between neighboring nodes, but also how those relationships influence the overall PCI configuration at a graph level.

For the encoder, the system utilizes two GAT layers. These layers are important because they allow the network to understand the 2-tier local neighborhood, which is vital for PCI planning as previously discussed. The GAT layers use attention mechanisms to capture the importance of node connections, combining both node features and graph structure into a meaningful representation. This is important for learning how the PCI assignments interact across the network.

The output of the GAT layers is then transformed into two distinct outputs—the $\mu$ and log $\sigma^2$—by using two separate MLP layers. These output layers retain the same dimensionality as the output of the final GAT layer and have no activation function included. This ensures that the necessary outputs are separated for use in the reparameterization step, which will ultimately define the latent space.

The reparameterization step is then applied, which is the key component for any CVAE model. This step allows the system to transform the normally non-differentiable sampling operation into a differentiable one by introducing a stochastic layer that samples from a normal distribution. The $\mu$ and log $\sigma^2$ outputs from the encoder are used to sample a latent variable z, which serves as the input to the decoder. The reparameterization process enables backpropagation through the sampling process, making the model trainable via gradient descent. Software code which is capable of implementing the reparameterization step is illustrated in FIG. 26 (written python as a normal distribution).

The decoder network of the present disclosure takes both the latent variable z and the original conditional variables as inputs. It is important that the generated PCI features not only reflect local node-level properties, but also adhere to the global graph-level constraints of the PCI problem. While the features are generated per node, the overall output is effectively at the graph level. To ensure the conditions guide the generation process appropriately, the system uses two GAT layers in the decoder. However, unlike the encoder, these GAT layers are designed to expand the dimensionality of the output, ensuring the generated features respect the global structure of the graph.

The use of GAT layers allows the decoder to leverage the attention mechanism to assess the importance of neighboring nodes. This is important for generating valid PCI features, as it ensures the generated features reflect the graph's overall structure, not just isolated node-level information. This means that the system can consider the original adjacency matrix as an additional condition for PCI feature generation and becomes an additional input to the decoder network.

After the GAT layers, the system applies a fully connected multi-layer perceptron (MLP) to further refine the node-level features and ensure that the output respects both the conditions and the global graph structure. The output of this MLP is designed with a dimensionality that reflects the original set of PCI categories, which in this case is 50. The system uses a softmax activation function at the output layer, which transforms the raw scores into a probability distribution over these 50 PCI values. The softmax function ensures that each node is assigned a probability for every possible PCI value, where the total of all possibilities equals 100%.

Figure 27:
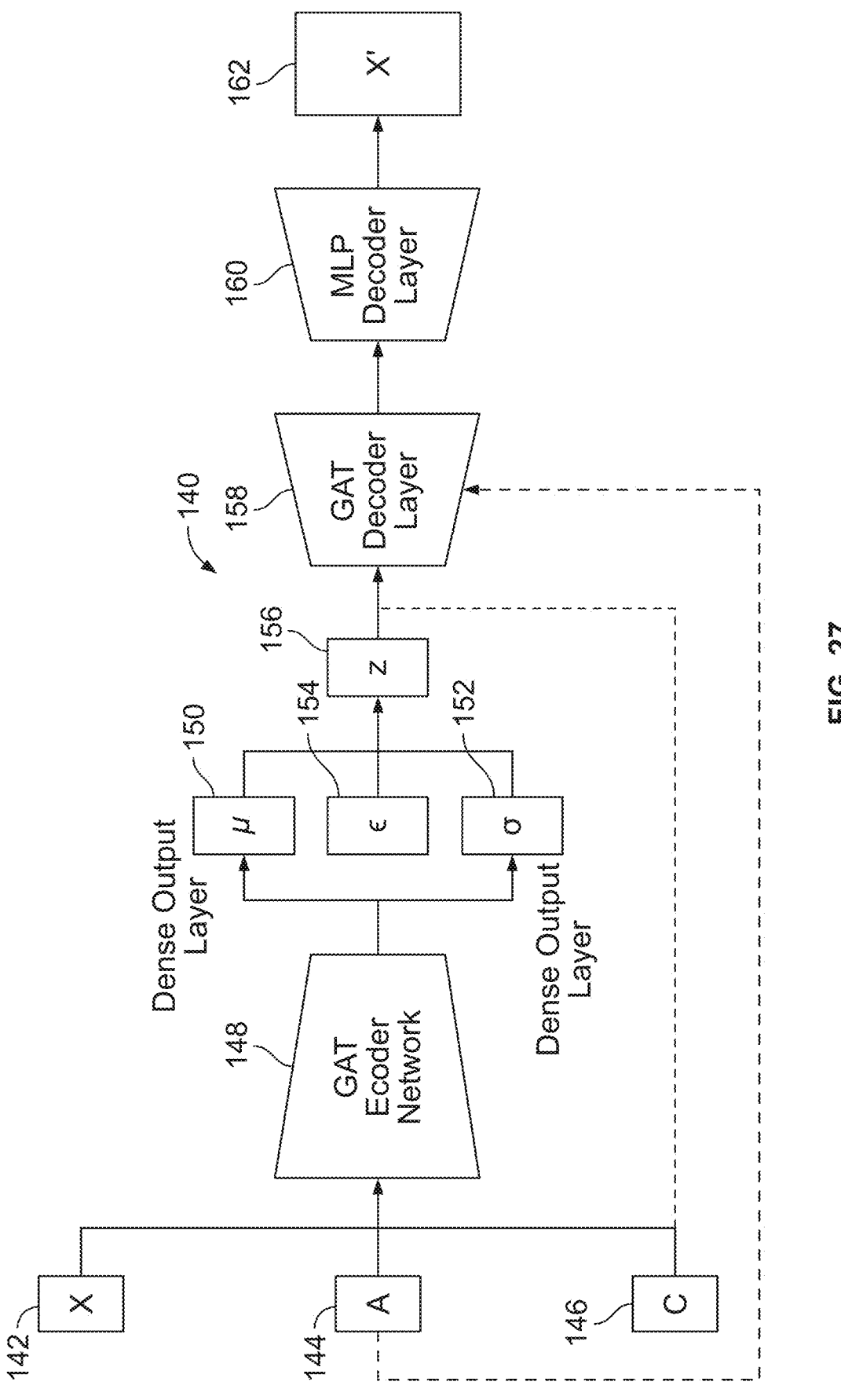
FIG. 27 is a diagram illustrating a PCI plan generator CVAE model in accordance with the systems and methods of the present disclosure.

FIG. 27 is a diagram illustrating a PCI plan generator CVAE model in accordance with the systems and methods of the present disclosure, indicated generally at 140. The model 140 processes inputs X (142), A (144), and c (146) using a GAT encoder network 148, producing dense output layers 150, 155, which are processed with noise 154 to produce latent variable z (156). The latent variable z (156) and input A (144) are then processed by a GAT decoder layer 158, which is then further processed by an MLP decoder layer 160, to produce output X' (162). While the complete architecture is designed to be trained end-to-end, the decoder 158 is the key component used for generating new data. The model 140 is designed such that its components can be used independently; specifically, the decoder 158 can be extracted and operated on its own.

Once the model has been trained, the system can directly sample a latent variable z (156) from the true normal distribution—the same distribution that the latent space was trained to match. By combining this latent variable z (156) with the original conditional variables (X (142), A (144), and c (146)), the decoder can generate new PCI plans. This allows the system to bypass the encoder 148 entirely when generating new data, efficiently producing PCI plans that reflect the learned distribution of the network.

FIG. 28 is a diagram illustrating software code in accordance with the present disclosure for training a CVAE using a custom loss function. Training the PCI plan generator CVAE model required several customizations, as the built-in methods in TensorFlow and Keras do not directly support the complexity of this architecture without additional adjustments. A custom loss function was created and custom training and test steps were defined to ensure the model learned both the reconstruction of the PCI features and the correct latent space representation. The custom loss function is designed to compute two key components: the reconstruction loss and the KL divergence, which together form the Evidence Lower Bound (ELBO). In variational autoencoder architecture, the ELBO balances how well the model reconstructs the data with how closely the learned latent space matches the prior distribution, typically a standard normal distribution. For the reconstruction loss, the system uses Sparse Categorical Cross-Entropy loss, which is suitable for cases like ours where the output consists of discrete PCI categories. The KL divergence is computed using the reparameterization step, leveraging the $\mu$ and log $\sigma^2$ learned by the encoder network to measure how far the learned latent space deviates from a standard normal distribution. By combining these two losses, the system ensures that the model optimizes both reconstruction quality and latent space regularization.

FIG. 29 is a diagram illustrating software code in accordance with the present disclosure for training and testing a CVAE. To accommodate the custom loss function and ensure proper training of the CVAE model, the system implemented custom training and test steps. These steps unpack the input data (including the graph node features, adjacency matrix, and conditional variables) and pass them through the model. During training, a gradient tape is used to compute the gradients based on the total loss, which includes both the reconstruction loss and KL divergence. These gradients are then applied to update the model's trainable variables. The test step similarly computes the losses but without updating the model, allowing for evaluation. This approach ensures smooth integration of the custom loss function into the model's training workflow.

Table 7, below, provides detailed information regarding the CVAE PCI plan generator model generated by the systems and methods of the present disclosure.

TABLE 7

| Model Summary | |
|---|---|
| Model Name | CVAE PCI Plan Generator |
| Model Description | This model is designed to generate optimized PCI plans for telecom networks. The model encodes graph node features, network adjacency structure, and conditional variables (PCI confusion, PCI issue contributor, and graph-level score) into a latent representation using GAT layers. The decoder, also leveraging GAT layers, generates new PCI assignments that respect the global graph structure. The model is trained with a custom loss function, combining Sparse Categorical Cross-Entropy for reconstruction loss and KL divergence to ensure efficient learning and latent space regularization. |
| ML Libraries Used | TensorFlow |
|  | Spektral |
| Model Architecture Type | Graph Attention Network (GAT) |
|  | Multi-Layer Perceptron (MLP) |
|  | Conditional Variational Autoencoder (CVAE) |
| Model Inputs | Single/Batched node feature matrix with N nodes each containing a PCI value pre categorical encoding |
|  | A set of three conditional variables: |
|  | A Boolean flag indicating if the cell is experiencing confusion |
|  | A Boolean flag indicating if the cell is causing a confusion |
|  | A graph level score indicating quality of the PCI plan (Same score broadcasted to every node per graph) |
|  | Graph adjacency matrix of shape (N, N) |
| Model Output | A PCI assignment generated for the entire CNS graph based on a set of initial conditions. |
|  | Encoder Network Layers |
| Embedding Layer | 50 categories |
|  | Embedding dimension: 10 |
| Reshape Layer | Flattening extra dimension created by embedding layer to match original node feature matrix shape of (N, F) |
| Concatenation Layer | Concatenating the conditional variables with the node feature matrix |

TABLE 7-continued

| GAT Layer 1 (Spektral) | Channels: 32 |
| | Attention heads: 8 |
| | Concatenate attention heads |
| | ReLU activation function |
| | No self-loops |
| GAT Layer 2 (Spektral) | Channels: 16 |
| | Attention heads: 4 |
| | Concatenate attention heads |
| | Tanh activation function |
| | No self-loops |
| Dense Output Layer for $\mu$ | 64 neurons |
| | No activation function |
| Dense Output Layer for log $\sigma^2$ | 64 neurons |
| | No activation function |
| | Reparameterization Step |
| Inputs | $\mu$ from encoder output |
| | log $\sigma^2$ from encoder output |
| Distribution Used | Normal distribution (Gaussian) |
| Output | Latent variable z for decoder input |
| | Decoder Network Layers |
| Inputs | Latent variable z |
| | A set of three conditional variables: |
| | A Boolean flag indicating if the cell is |
| | experiencing confusion |
| | A Boolean flag indicating if the cell is causing a |
| | confusion |
| | A graph level score indicating quality of the |
| | PCI plan (Same score broadcasted to every |
| | node per graph) |
| | Graph adjacency matrix of shape (N, N) |
| Dense Layer 1 | 10 neurons |
| | No activation function |
| | Designed to reduce dimensionality before for |
| | concatenation of conditional variables |
| Concatenation Layer | Concatenating the conditional variables with latent |
| | variable z |
| GAT Layer 1 (Spektral) | Channels: 16 |
| | Attention heads: 4 |
| | Concatenate attention heads |
| | ReLU activation function |
| | No self-loops |
| GAT Layer 2 (Spektral) | Channels: 32 |
| | Attention heads: 8 |
| | Concatenate attention heads |
| | ReLU activation function |
| | No self-loops |
| Dense Layer 2 | 512 neurons |
| | Batch normalization |
| | ReLU activation function |
| Dense Output Layer | 50 neurons |
| | Softmax activation function |
| | Dataset |
| Data Source | The simulated network deployment described above. |
| Data Preprocessing | We simulated 220,000 different variations of PCI |
| | plans by shuffling (not randomizing) the PCI |
| | assignments for all nodes. |
| | Each PCI plan has the same adjacency matrix. Ideally, |
| | we want to avoid changing the nieghbor list for cells |
| | when planning PCI if possible (this isn't a link |
| | prediction model). |
| | Each graph was classified using both the GAT PCI |
| | Confusion Classifier and GAT PCI Issue Classifier to |
| | generate the three conditional variables needed for |
| | each node |
| Dataset Size | Training Data: 200,000 shuffled PCI plans |
| | Validation Data: 20,000 shuffled PCI plans |
| | Training Details |
| Loss Function (Custom) | Sparse Categorical Cross-Entropy for reconstruction |
| | loss |
| | KL Divergence for probability distribution |
| | comparison |
| | Combined loss function was designed to reduce the |
| | combination of these two individual loss functions |

TABLE 7-continued

| Optimizer | Adam |
| Learning Rate | TensorFlow's default learning rate |
| Batch Size | 64 |
| # of Epochs | 100 |
| | Training Results |

| Training Dataset Results | Combined Loss: 0.1108 |
| | Reconstruction Loss: 0.0739 |
| | KL Divergence: 0.0369 |
| Validation Dataset Results | Combined Loss: 0.1129 |
| | Reconstruction Loss: 0.0713 |
| | KL Divergence: 0.0416 |
| | Conclusion |

This model was able to achieve low combined loss function. Both the KL divergence and reconstruction losses are very low, indicating that the model is performing equally on seen vs unseen data. The small value of the KL divergence can suggest that the model is experiencing posterior collapse. Subsequent training with additional constraints, such as a β term introduced in the loss function, can help mitigate these issues in future model iterations. The model is still able to learn reconstructions of the data, however due to a vast majority of the PCI plans being imperfect still requires the retuning agent to further refine the output over time.

FIG. 30 is a diagram illustrating training results of the CVAE PCI plan generator model discussed above in connection with Table 7.

FIGS. 31-34 are screenshots illustrating user interface screens generated by the system of the present disclosure. Once all the components—the PCI Confusion Classifier, PCI Issue Classifier, PCI retune agent, and the CVAE PCI Plan Generator—were properly constructed and trained, they were deployed into the inference module, making them available to run on the simulated network within an instance of the AI engine.

Figure 31:
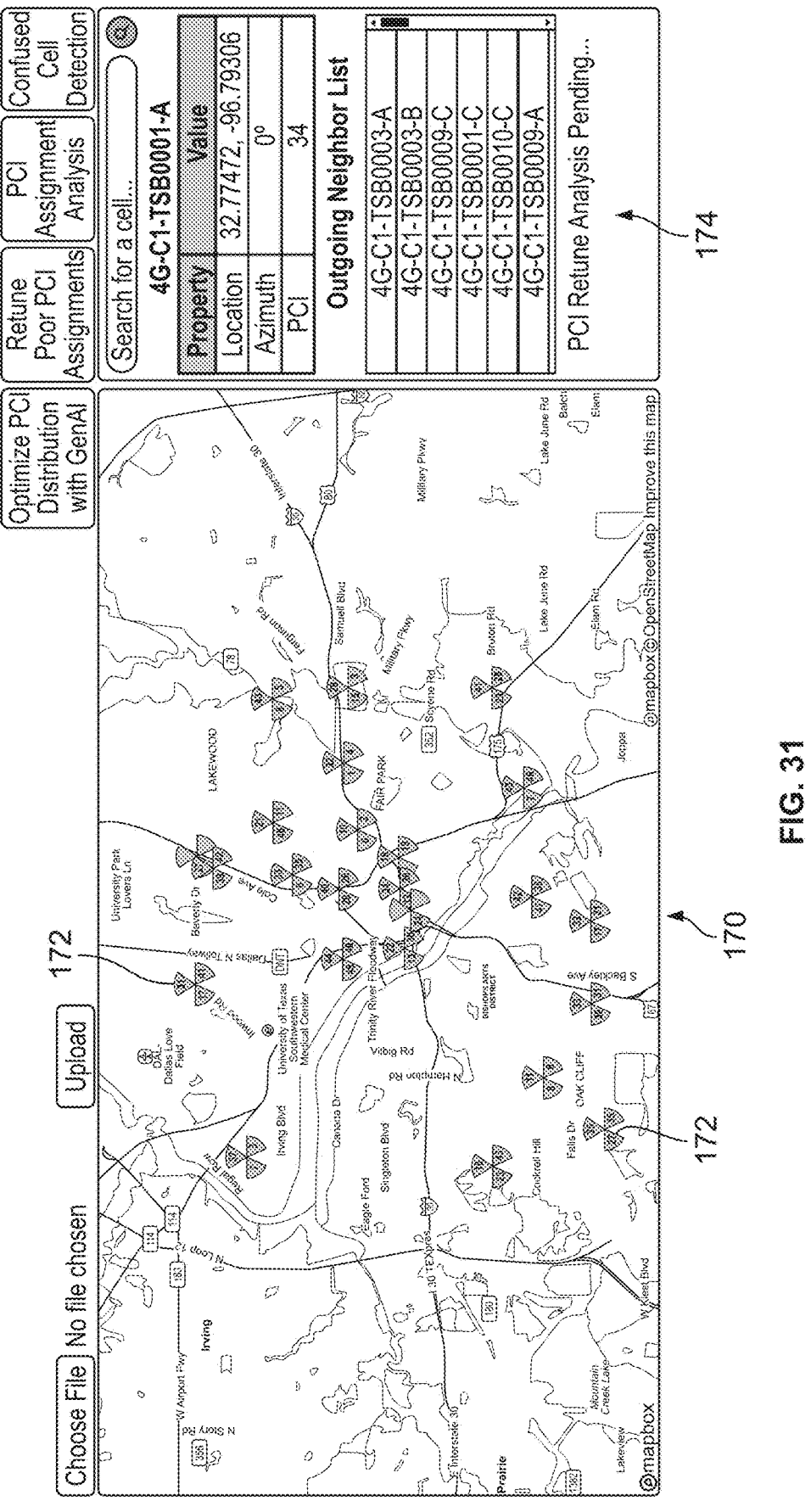
FIGS. 31-34 are screenshots sample illustrating user interface screens generated by the system of the present disclosure.

FIG. 31 illustrates a first user interface connected to the AI engine, and includes a geographic display area 170 graphically displaying cell sites 172 that are the subject of modeling by the systems and methods of the present disclosure. Also included is an outgoing neighbor list 174 showing outgoing neighbor cell sites, and additional fields indicating a property name, location, azimuth, and PCI value. The network graph of the system operates in the background, utilizing the graph database to ensure that any model executed by the system interacts graphically with the data.

Figure 32:
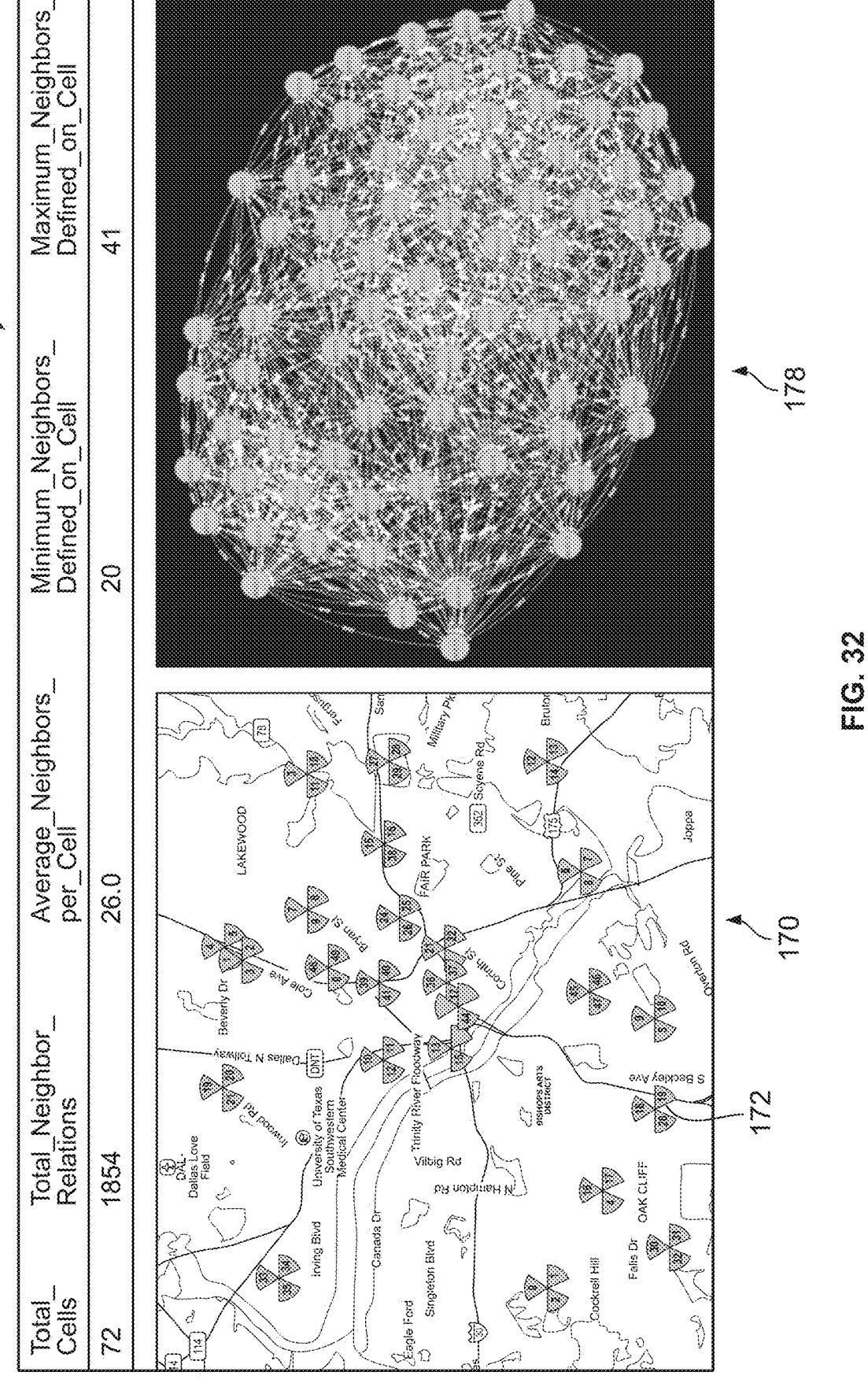

FIG. 32 illustrates a second user interface screen connected to the AI engine, which displays both the geographical display area 170 and the cell sites 172, as well as a graphical representation 178 of the network graph generated by the systems and methods of the present disclosure.

To test the robustness of the system, all PCI values were reset to zero, effectively placing the network in its worst possible state—every PCI assignment was poor, and the overall network was highly confused. Running the full network-level PCI planning process—which included running the CVAE PCI Plan Generator, PCI issue classifier, and retuning agent together allowed the system to collaboratively generate the ideal PCI plan based on the network's current structure and cell relationships. In under 7 seconds, the system successfully generated a PCI plan that was fully optimized for the network's current conditions and the neighboring relationships between cells. All generated plans are validated by the GAT models of the system, already trained to identify PCI problems within network graphs.

Figure 33A:
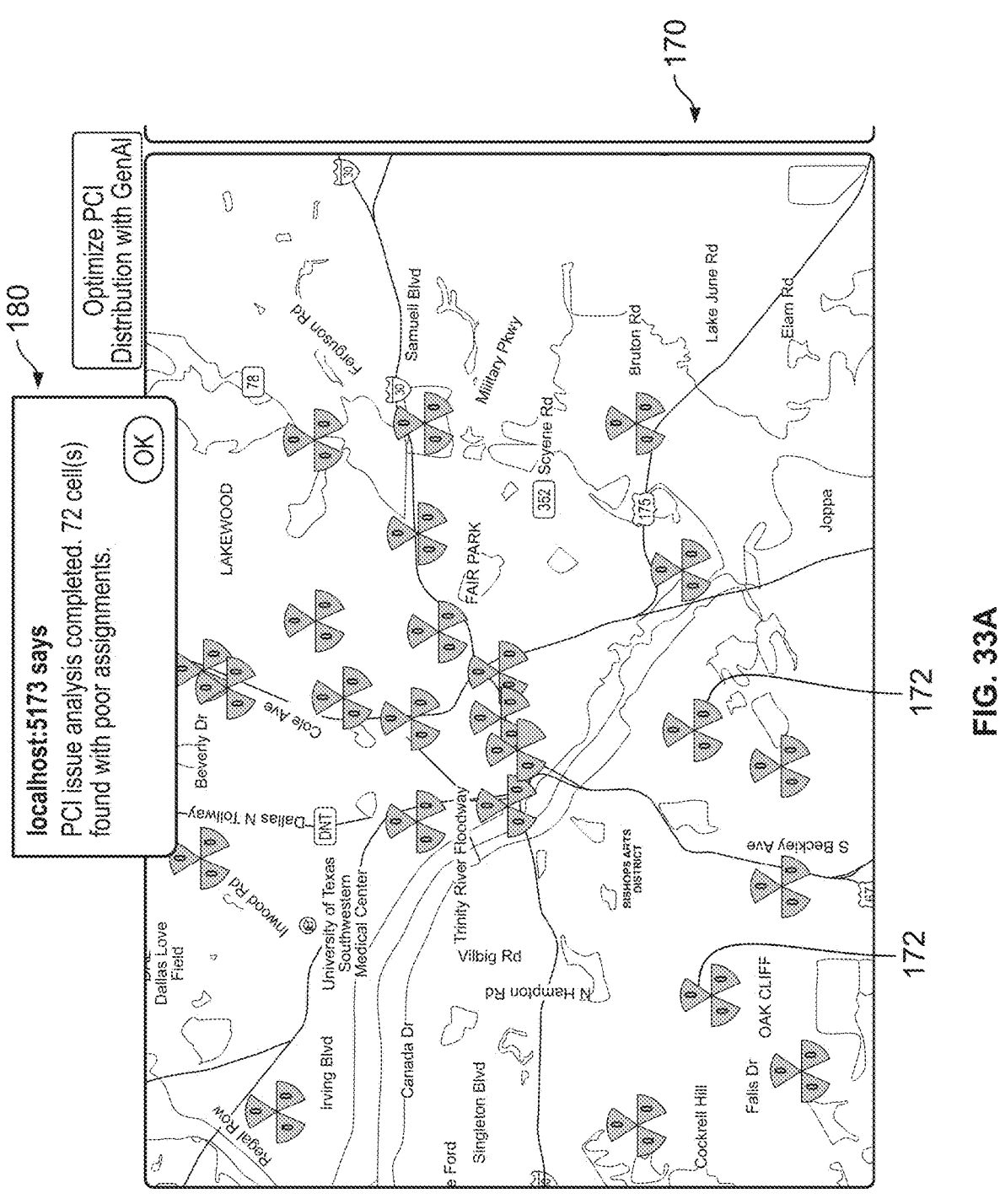
Figure 33B:
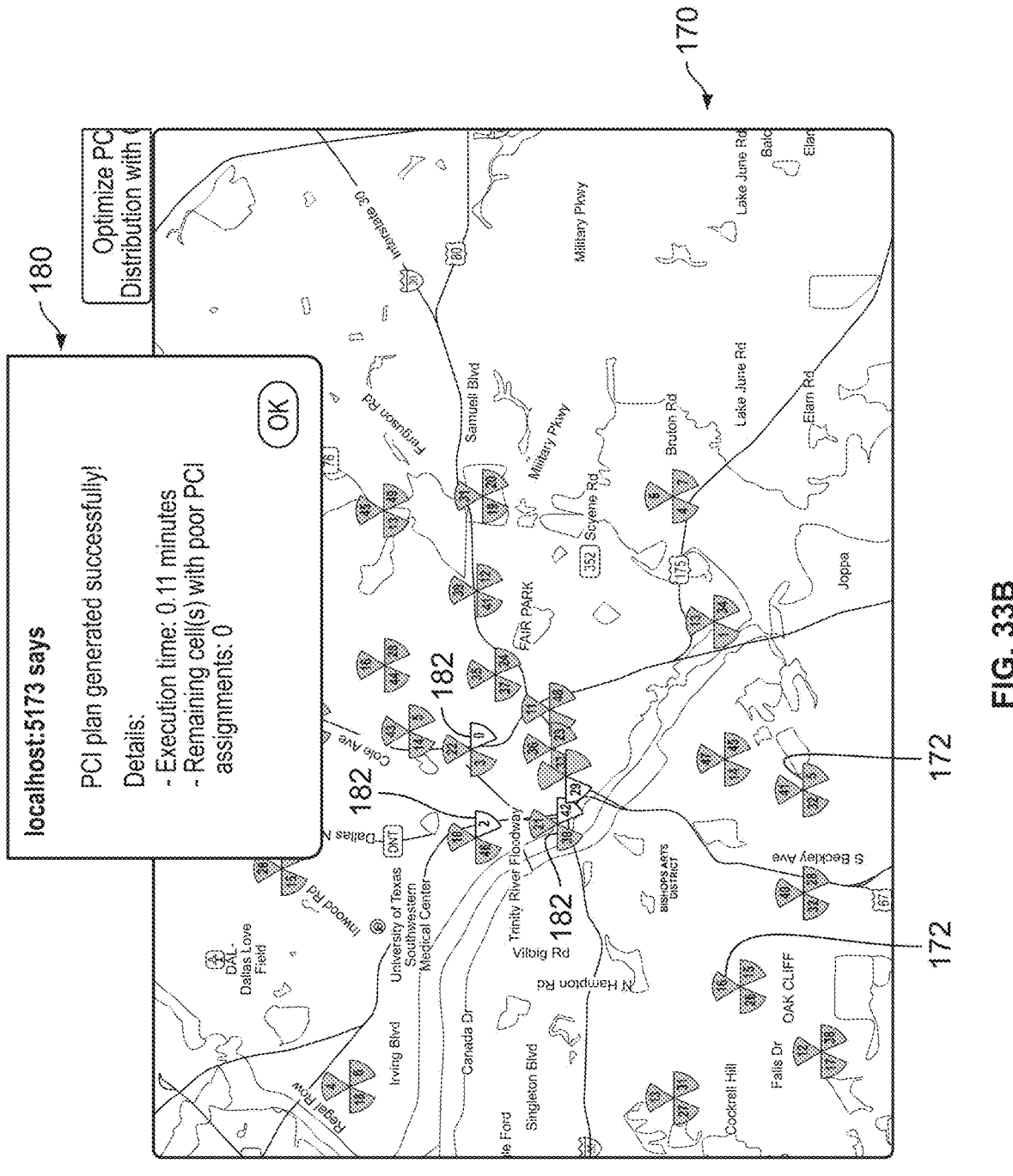

FIGS. 33A-33B show additional user interface screens generated by the system which, in addition to the geographical display portion 170, also include dialog boxes 180 that display information relating to modeling as it is being conducted. The screen shown in FIG. 33A illustrates the network initialized with the worst possible PCI plan (requiring the retuning off every cell's PCI value), while the screen shown in FIG. 33B illustrates the network PCI plan after using a graph-centric AI solution generated by the systems and methods of the present invention (wherein a PCI plan with zero confusions present was generated in less than 7 seconds).

Given the limited pool of available PCI values, combined with the number of neighbors per cell, there are scenarios where a perfect PCI plan may not be achievable. When the number of neighbors per cell is high relative to the available PCI values, the logical complexity of finding a solution increases due to the nature of graph data. In some cases, focusing solely on the problematic PCI values is not enough to resolve the issue. This happens when all possible PCI values in the two-tier neighborhood of a problematic cell are already in use, leaving no available values for retuning. In such cases, the only solution is to adjust the PCI value of a neighboring cell that has more flexibility within its own two-tier neighborhood, even if it may not currently be contributing to any issue. By freeing up that PCI value, the problematic cell can be reassigned to a different PCI, resolving the conflict.

In our simulated network, the number of neighbors each cell has does mirror real-world deployment scenarios. However, by limiting the PCI range the system has intentionally increased the challenge of finding a perfect plan. In this scenario, many imperfect solutions exist where non-problematic PCI values need to be re-tuned to perfect the PCI plan. The present system—driven by the generative CVAE model—allows for the adjustment of any PCI values, even those that aren't directly contributing to the poor state of the network. This added flexibility increases the solution space, enabling the model to generate more comprehensive and globally optimized PCI plans, even in cases where non-problematic PCIs must be adjusted to create the optimal configuration.

In real-world networks, the situation where finding a perfect PCI plan requires changing non-problematic PCI values is much more rare. With 4G networks providing 504 available PCI values and 5G networks expanding this to 1008, there is significant flexibility to avoid conflicts without needing to adjust PCI values that aren't causing issues. If the PCI pool is exhausted and such changes are necessary, it usually indicates a broader issue, such as poorly optimized coverage areas leading to too many neighbor cells. By limiting the PCI pool in simulations, the system purposely increased the difficulty of finding a perfect plan, which further highlights the robustness of the system.

Figure 34:
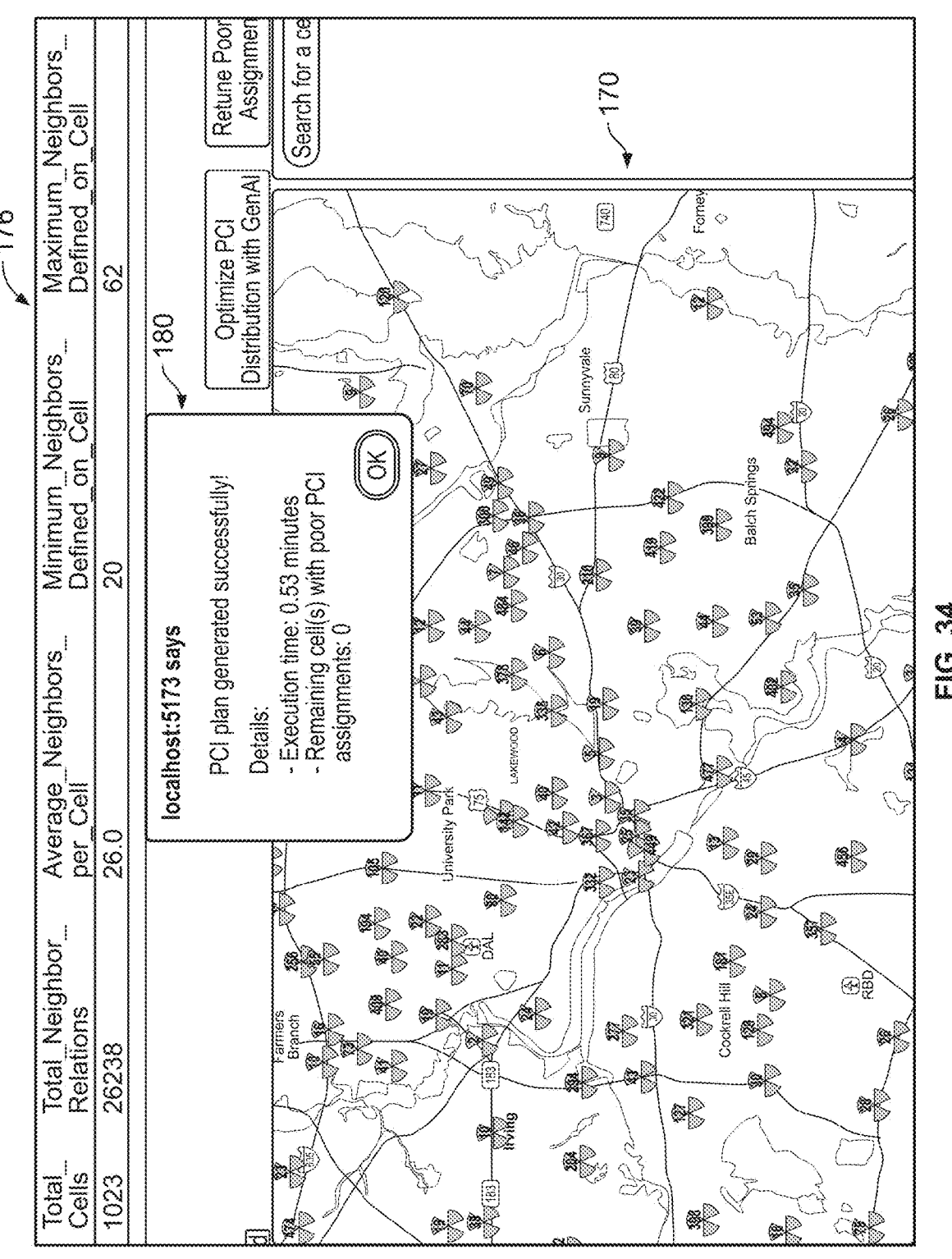

FIG. 34 is a diagram illustrating user interface output generated by the systems and methods of the present invention, wherein the system was tested using a larger network data set. A separate test scenario was conducted wherein the system expanded the network to 341 sites (1023 cells) and used the actual LTE PCI pool of 504 PCI values. The setup for simulating neighbor relationships remained the same as the original, based on geographic proximity. The system trained new models for the two deterministic GNN models responsible for generating the conditional variables (PCI confusion flag and PCI issue contributor flag), adjusting them for 504 categories instead of the original 50. All other parameters and the training setup were kept identical. One aspect that was not modified was the generative CVAE model. This model was already designed to accept flexible inputs and outputs, and can implement the same PCI planning process, incorporating the retrained models to account for the expanded category set, and successfully generating a perfect PCI plan for the 1023 cells in approximately 30 seconds.

The graph-centric deep learning framework of the systems and methods of the present disclosure is designed to enable more intelligent, adaptable network management, leveraging the inherent structure of telecom networks. This approach can be applied to several key areas of network optimization, transforming the network into a truly learning system capable of continuous self-improvement, such as coverage optimization and mobility optimization.

Coverage optimization focuses on how well the coverage areas of different cells overlap to ensure strong signal strength, quality, and minimal interference. Maintaining high signal quality is essential because poor coverage directly impacts user experience, leading to dropped connections, slow data speeds, and overall frustration for network users. The system's graph-centric deep learning framework can be applied to enhance coverage optimization by leveraging the network's inherent structure. By representing the network as a graph, the framework understands the relationships between neighboring cells and how coverage adjustments in one cell can affect the surrounding cells. This approach allows for more informed decisions regarding antenna tilt and power configurations, ensuring that coverage areas overlap efficiently without causing interference. The framework can learn from the network's topology and suggest strategies to improve signal quality and user experience while maintaining overall network balance.

Mobility optimization focuses on ensuring that users remain seamlessly connected as they move within the network and transition between cells. Handovers are managed through various thresholds configured in the network, which determine when a UE should switch to a different cell based on reported signal strength, signal quality, frequency priority, and various other factors. Tuning these configurations effectively is crucial for minimizing dropped voice calls and maintaining uninterrupted data sessions during cell transitions. The system's graph-centric deep learning framework is particularly well-suited for optimizing handovers and mobility management. The edges in the network graph are modeled after the cell relations and X2/Xn interfaces the components of the network that physically orchestrate and manage network mobility.

The graph-based approach disclosed herein can learn how different mobility parameters affect handover performance between different pairs of cells across the network. By analyzing the mobility KPIs, such as handover success and failure rates, the framework can suggest adjustments that optimize mobility configurations on a relation-level. This allows for different mobility thresholds to be configured dynamically to help ensure the best performance based on the unique elements of different network areas.

The systems and methods of the present disclosure are ideal for implementing effective load balancing schemes as part of optimizing network mobility. Load balancing is a different type of transition where mobility is triggered by the load on a cell rather than the user moving between different coverage areas. It focuses more on the efficient use of resources through optimizing traffic distribution across the network.

In modern networks, a sector can have multiple carriers operating at different frequencies, all serving the same area. Load balancing uses inter-frequency handovers to shift traffic between these layers, redistributing users from heavily loaded carriers to those with more available capacity. The goal is to optimize resource utilization within the same coverage area without affecting the user's experience. It ensures that users remain connected to the most optimal frequency layer, even within the same sector, improving the overall efficiency of the network.

The system's graph-centric deep learning framework can be applied to optimize load balancing by learning how load thresholds and inter-frequency mobility decisions affect network performance. The framework can analyze the relationships between neighboring cells and sectors, understanding how load shifts within the local cluster impacts its overall performance. It could then predict which technology layer would best handle additional traffic, setting the relation-level threshold to shift various amounts of traffic to that layer. This allows the network to maintain optimal performance even during peak demand periods by dynamically adjusting traffic distribution across layers.

Maintaining performance during unexpected changes or planned adjustments is crucial. Whether it is an outage or the deployment of a new cell site, understanding the network's behavior as a whole is essential for making informed optimization decisions. The systems and methods of the present disclosure are excellent for designing this type of use case, as the primary goal of the system is to understand the network, rather than just fix the network.

When the network state changes—such as during an outage—the system can assess the impact on the local area, focusing on how neighboring cells are affected. By understanding the interactions between these cells within the network graph, it can identify how local performance is impacted and suggests optimal adjustments. This may include recalibrating antenna tilt of neighboring sites to maintain coverage continuity or modifying load balancing parameters to offload now congested cells, ensuring service quality is maintained with minimal disruption.

Similarly, when deploying new sites, the system helps predict how these additions will affect the surrounding network. By incorporating the new site into the graph, the system can adjust coverage, mobility, and other configurations to seamlessly integrate the site, ensuring efficient coverage and preventing interference. This allows for seamless integration of new sites, optimizing the network immediately to accommodate any additional elements.

The systems and methods of the present disclosure can be utilized for various future applications. The telecommunications industry is gradually exploring new network architectures, such as Centralized RAN (C-RAN) and Virtual RAN (vRAN), which aim to centralize and virtualize network functions to better utilize resources and improve scalability. These architectures represent a shift from traditional, hardware-dependent models to more flexible, software-defined systems that promise greater efficiency. However, full-scale adoption of these approaches remains limited as the industry grapples with the complexities of transitioning to more dynamic and scalable networks.

At the same time, Open RAN (O-RAN) is gaining momentum as a key initiative in telecom, enabling the disaggregation of hardware and software and promoting vendor interoperability. O-RAN introduces the need for more advanced orchestration and coordination of network components, particularly in multi-vendor environments. This shift to open, cloud-native, and centralized models presents a unique opportunity to rethink how networks are managed, not just at the operator level but across the entire telecommunications ecosystem.

The graph-centric AI framework of the systems and methods of the present disclosure seamlessly integrates into the RAN Intelligent Controller (RIC) component of O-RAN. The RIC is designed to orchestrate and optimize RAN operations in within the O-RAN environment. Within its current architecture, there exists the concept of Non-Real-Time RAN Applications (rApps) and Near-Real-Time RAN Application (xApps). Both rApps and xApps are responsible for managing and optimizing various RAN functions. However, the AI engine of the system can slot directly into this part of the RIC architecture, taking over the role of both rApps and xApps. The graph-centric, generative AI approach is perfectly suited for handling these real-time and non-real-time optimization tasks, enabling the network to make intelligent decisions and adjustments dynamically. By utilizing this unified AI engine, the system allows for the development of rAPP and xAPP (RAN management and optimization application) functionalities, creating a smarter and more efficient network management system.

Looking further into the future, the potential of the graph-based deep learning approach of the system extends beyond RAN optimization and into full RAN orchestration. By expanding the network graph to encompass all network elements and the interfaces connecting them, the system could help orchestrate the entire RAN, not just optimize it. O-RAN, with its multi-vendor, disaggregated components, presents unique challenges in ensuring seamless interoperability. However, with graph-based learning and generative AI, the system could learn how to orchestrate these diverse components, adapting dynamically to different hardware and software from various vendors. This ability to generalize across vendors and components could solve one of the major hurdles in O-RAN, making it easier to coordinate and scale the network. By focusing on the underlying structure and relationships within the network, the AI-driven system would enable smooth orchestration, ensuring that network performance is optimized, regardless of the specific vendors involved.

The advancement of modern telecommunications networks requires a shift from traditional, static methods to intelligent, adaptable systems. Through the integration of graph-centric AI and generative models, the systems and methods of the present disclosure enable the network to learn, adapt, and optimize in ways that were previously unattainable. This approach sets a new standard for network automation, moving beyond the conventional limitations of Self-Organizing Networks (SON) to create a truly learning-driven RAN.

By harnessing the power of deep learning, the system demonstrates its immediate potential to enhance current RAN operations, while also laying the foundation for future applications within cloud-native and O-RAN environments. The flexibility of this approach allows it to integrate seamlessly into emerging architectures, enhancing the intelligent nature of rApps and xApps within the RIC. This adaptability positions the system as a critical enabler for smarter, more efficient network management across a wide range of use cases.

As the telecom industry continues to evolve, the broader potential of graph-based learning extends to the orchestration of complex, multi-vendor networks. By dynamically learning and adapting to different configurations and components, the system can address one of the key challenges in Open RAN: ensuring seamless interoperability across diverse systems. The system is not just a tool for optimization; it represents the future of network management one that adapts, evolves, and scales to meet the demands of next-generation telecom ecosystems.

Figure 35:
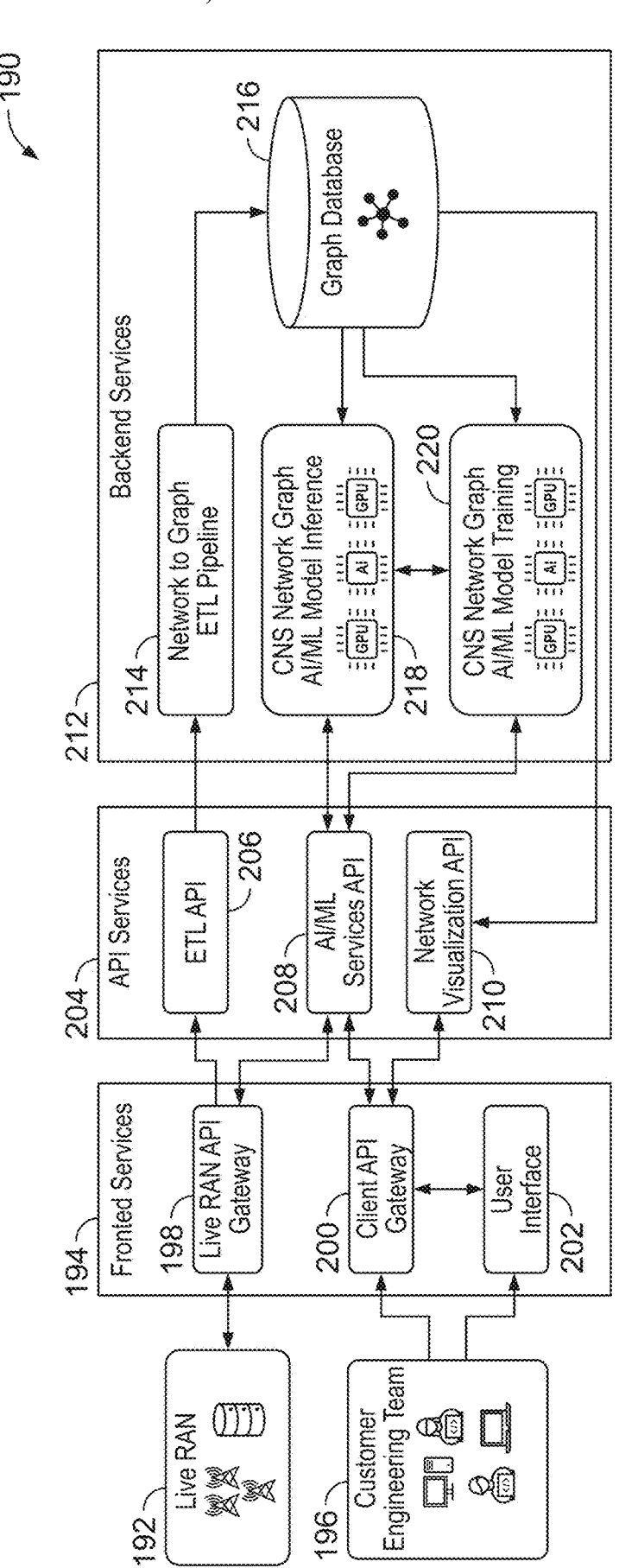
FIG. 35 is a diagram another implementation of the systems and methods of the present disclosure.

FIG. 35 is a diagram, indicated generally at 190, illustrating another implementation of the systems and methods of the present disclosure. In this implementation, the systems and methods include a plurality of front-end software services 194, a plurality of API services 204, and a plurality of back-end services 212. The front-end services 194 include a live radio access network (RAN) application programming interface (API) gateway 198 which obtains live status information from a live RAN 192, a client API gateway 200 which interfaces with one or more customer engineering teams 196 and their associated computer systems, and a user interface 202 (which could generate one or more of the user face screens discussed herein in connection with FIGS. 31-34). The API services 204 include an ETL API 206 which obtains RAN status information from the RAN API gateway 198, an AI/ML services API 208 which communicates with the RAN API gateway 198 and the client API gateway 200, and a network visualization API 210 that communicates with the client API gateway 200. The back-end services 212 include a network-to-graph ETL pipeline 214 (which communicates with the ETL API 206 and performs the functions described above in connection with the ETL pipeline 118 of FIG. 12), a network graph AI/ML model inference module 218 (which communicates with the AI/ML services API 208 and performs the functions described above in connection with the model inference module 124 of FIG. 12), a network graph AI/ML model training module 220 (which communicates with the AI/ML services API 208 and performs the functions described above in connection with the model training module 122 of FIG. 12), and a graph database 216 (which performs the functions described above in connection with the graph database 116 of FIG. 12).

The implementation shown in FIG. 35 allows for easy deployment of the systems and methods of the present disclosure using API calls provided by the API services 204, as well as the front-end services 194. It is also noted that the API services 204 and/or front-end services 194 could be utilized by the back-end services 190 to transmit updated configuration information to the live RAN 192 and/or to the customer engineering team 196 so as to effectuate optimization of the live RAN 192 in accordance with optimized network plans/settings/configurations that are generated by the back-end services 190 in accordance with the systems and methods of the present disclosure. Indeed, such optimization of the live RAN 192 could be carried out by the system automatically and in real-time, if desired, so that there is continuous monitoring, optimization, and reconfiguration of the live RAN 192 by the systems and methods of the present disclosure, as needed/desired.

While the systems and methods of the present disclosure have been described above in connection with the usage of graph attention networks and convolutional neural networks, it is noted that other types of machine learning networks or architectures could be utilized without departing from the spirit or scope of the present disclosure. For example, machine learning networks having transformer-style convolution layers, such as the TransformerConv transformer or other suitable equivalent, could be utilized for neural message passing. Such transformer networks apply principles of the transformer architecture to graph-structured data, and provide several advantages, including, but not limited to, multi-dimensional attention via a query-key-value (QVK) mechanism (which involves a QVK attention formulation that allows each node to learn high-dimensional attention patterns based on the semantic similarity between the node's features and those of its neighbors, leading to more nuanced aggregation of contextual information), dot product attention and context sensitivity (which allows for more context-sensitive learning as the similarity between queries and keys is computed in a continuous, vectorized space (allowing for fine-grained differentiation among neighboring nodes, especially in dense or heterogeneous cell neighbors where scalar coefficients in graph attention networks may saturate or collapse), and built-in residual connections for stability (the residual skip connections of transformer neural networks help to preserve original node identities across multiple layers, which mitigates the common issue of over-smoothing in deep graph neural networks, where embeddings of different nodes become indistinguishably similar after repeated aggregation steps).

Having thus described the systems and methods in detail, it is to be understood that the foregoing description is not intended to limit the spirit or scope thereof. It will be understood that the embodiments of the present disclosure described herein are merely exemplary and that a person skilled in the art can make any variations and modification without departing from the spirit and scope of the disclosure. All such variations and modifications, including those discussed above, are intended to be included within the scope of the disclosure. What is desired to be protected by Letters Patent is set forth in the following claims.

What is claimed is:

1. A machine learning system for computer modeling and optimization of a telecommunication network, comprising:
    an artificial intelligence (AI) modeling processor in communication with a telecommunication network, the AI modeling processor:
        receiving information relating to operation of a cluster of communication nodes within the telecommunication network;
        processing the information to generate a directed network graph that represents the telecommunication network as a series of connected edges and nodes;
        storing the directed network graph in a graph database;
        processing the directed network graph using an AI model to generate an optimized version of the network graph, the AI model trained to optimize at least one attribute relating to the telecommunication network; and
        generating and displaying a visualization of the optimized version of the network graph in a visualization interface.

2. The system of claim 1, wherein the telecommunication network comprises at least one of a wireless network, a cellular telephone network, or a radio access network (RAN).

3. The system of claim 2, wherein each node of the directed network graph represents a cell within the cellular telephone network and each edge of the directed network graph represents an interaction between two cells of the cellular telephone network.

4. The system of claim 3, wherein each node of the directed network graph stores geographical data representing a physical location and a coverage area of an associated cell, configuration data representing an operational parameter of the cell, and performance data representing a performance metric of the cell.

5. The system of claim 4, wherein the geographical data comprises one or more of geographical coordinates, sector azimuth, or a center of radiation.

6. The system of claim 4, wherein the configuration data comprises one or more of power settings, antenna tilt data, frequency band data, physical cell identity, or a licensed feature setting.

7. The system of claim 4, wherein the performance data comprises one or more of traffic load data, physical resource block utilization data, signal quality data, throughput data, or voice experience data.

8. The system of claim 1, wherein the AI model comprises at least one of a graph neural network (GNN), a graph attention (GAT) network, a message passing neural network (MPNN), a convolutional neural network (CNN), a variational autoencoder (VAE), a conditional VAE (CVAU), a multi-layer perceptron (MLP), or a transformer network.

9. The system of claim 1, wherein the at least one attribute comprises transmitter power, antenna tilt, radio resource control information, handover attempts, or collisions.

10. The system of claim 1, wherein the AI modeling processor executes a network to graph extraction-transform-load (ETL) pipeline to populate the graph database using raw telecommunication data from the telecommunication network.

11. The system of claim 1, wherein the AI modeling processor trains the AI model in a training module and deploys a validated AI model in an inference module, wherein the training module is isolated from the inference module.

12. The system of claim 1, further comprising a radio access network (RAN) application programming interface (API) executed by the AI modeling processor for obtaining live status information from a RAN.

13. The system of claim 12, further comprising a client API gateway executed by the AI modeling processor for interfacing with a computer system operated by a customer engineering team.

14. A machine learning method for computer modeling and optimization of a telecommunication network, comprising:
    receiving by an artificial intelligence (AI) modeling processor information from a telecommunication network relating to operation of a cluster of communication nodes within the telecommunication network;
    processing the information to generate a directed network graph that represents the telecommunication network as a series of connected edges and nodes;
    storing the directed network graph in a graph database;
    processing the directed network graph using an AI model to generate an optimized version of the network graph, the AI model trained to optimize at least one attribute relating to the telecommunication network; and generating and displaying a visualization of the optimized version of the network graph in a visualization interface.

15. The method of claim 14, wherein the telecommunication network comprises at least one of a wireless network, a cellular telephone network, or a radio access network (RAN).

16. The method of claim 15, wherein each node of the directed network graph represents a cell within the cellular telephone network and each edge of the directed network graph represents an interaction between two cells of the cellular telephone network.

17. The method of claim 16, wherein each node of the directed network graph stores geographical data representing a physical location and a coverage area of an associated cell, configuration data representing an operational parameter of the cell, and performance data representing a performance metric of the cell.

18. The method of claim 17, wherein the geographical data comprises one or more of geographical coordinates, sector azimuth, or a center of radiation.

19. The method of claim 17, wherein the configuration data comprises one or more of power settings, antenna tilt data, frequency band data, physical cell identity, or a licensed feature setting.

20. The method of claim 17, wherein the performance data comprises one or more of traffic load data, physical resource block utilization data, signal quality data, throughput data, or voice experience data.

21. The method of claim 14, wherein the AI model comprises at least one of a graph neural network (GNN), a graph attention (GAT) network, a message passing neural network (MPNN), a convolutional neural network (CNN), a variational autoencoder (VAE), a conditional VAE (CVAU), a multi-layer perceptron (MLP), or a transformer network.

22. The method of claim 14, wherein the at least one attribute comprises transmitter power, antenna tilt, radio resource control information, handover attempts, or collisions.

23. The method of claim 14, further comprising executing, by the AI modeling processor, a network to graph extraction-transform-load (ETL) pipeline to populate the graph database using raw telecommunication data from the telecommunication network.

24. The method of claim 14, further comprising training, by the AI modeling processor, the AI model in a training module and deploying a validated AI model in an inference module, wherein the training module is isolated from the inference module.

25. The method of claim 14, further comprising obtaining live status information from a radio access network (RAN) using a RAN application programming interface (API).

26. The method of claim 25, further comprising interfacing the AI modeling processor with a computer system operated by a customer engineering team using a client API.

* * * * *